(12) United States Patent
Armstrong et al.

(10) Patent No.: US 10,201,833 B2
(45) Date of Patent: Feb. 12, 2019

(54) MODULAR PROJECTOR FOR MARINE SEISMIC SOURCE

(71) Applicants: PGS Geophysical AS, Oslo (NO); Geospectrum Technologies Inc., Dartmouth (CA)

(72) Inventors: Bruce Armstrong, Dartmouth (CA); Paul Yeatman, Dartmouth (CA); Øystein Traetten, Asker (NO); Mattias Oscarsson, Oslo (NO); Rune Voldsbekk, Orammen (NO); Rune Tønnessen, Lummendalen (NO)

(73) Assignees: PGS Geophysical AS, Oslo (NO); Geospectrum Technologies Inc., Dartmouth, NS (CA)

( * ) Notice: Subject to any disclaimer, the term of this patent is extended or adjusted under 35 U.S.C. 154(b) by 165 days.

(21) Appl. No.: 15/300,060

(22) PCT Filed: Oct. 30, 2014

(86) PCT No.: PCT/EP2014/073325
§ 371 (c)(1),
(2) Date: Sep. 28, 2016

(87) PCT Pub. No.: WO2015/063209
PCT Pub. Date: May 7, 2015

(65) Prior Publication Data
US 2017/0184742 A1 Jun. 29, 2017

Related U.S. Application Data

(60) Provisional application No. 61/898,246, filed on Oct. 31, 2013, provisional application No. 61/898,234, filed on Oct. 31, 2013, provisional application No. 61/898,245, filed on Oct. 31, 2013.

(51) Int. Cl.
*G01V 1/00* (2006.01)
*B06B 1/06* (2006.01)
(Continued)

(52) U.S. Cl.
CPC .............. *B06B 1/0611* (2013.01); *G01V 1/04* (2013.01); *G01V 1/135* (2013.01); *G01V 1/145* (2013.01);
(Continued)

(58) Field of Classification Search
CPC ...... B06B 1/0611; G01V 1/135; G01V 1/145; G01V 1/159; G01V 1/04; G01V 1/38; G10K 9/04; G10K 9/125; G10K 11/04
See application file for complete search history.

(56) References Cited

U.S. PATENT DOCUMENTS 3,978,940 A 9/1976 Bouyoucos
4,135,142 A 1/1979 Percy et al.
(Continued)

OTHER PUBLICATIONS

International Search Report for PCT Application No. PCT/EP2014/073327, dated Apr. 9, 2015.
(Continued)

*Primary Examiner* — Krystine E Breier

(57) ABSTRACT

An apparatus is disclosed which may include a plurality of marine seismic sources. According to some embodiments, these marine seismic sources may include a plurality of piezoelectric components. Such an apparatus may provide a useful sound pressure level for conducting marine seismic surveying. According to some embodiments, a conduit may be coupled between the plurality of marine seismic sources and a gas reservoir external to the plurality of marine seismic sources. The conduit may in some embodiments have at least one adjustable dimension for changing a frequency of the apparatus. The apparatus may be used in a method of marine seismic surveying.

24 Claims, 21 Drawing Sheets

(51) Int. Cl.
- *G01V 1/135* (2006.01)
- *G01V 1/145* (2006.01)
- *G01V 1/02* (2006.01)
- *G10K 9/04* (2006.01)
- *G10K 9/125* (2006.01)
- *G01V 1/04* (2006.01)
- *G01V 1/38* (2006.01)
- *G10K 11/04* (2006.01)

(52) U.S. Cl.
CPC ............... *G01V 1/159* (2013.01); *G01V 1/38* (2013.01); *G10K 9/04* (2013.01); *G10K 9/125* (2013.01); *G10K 11/04* (2013.01)

(56) References Cited

U.S. PATENT DOCUMENTS

| | | | |
|---|---|---|---|
| 4,142,171 A * | 2/1979 | Pickens | G10K 9/10 367/13 |
| 5,233,570 A | 8/1993 | Donskoy | |
| 5,894,451 A | 4/1999 | Dejaco | |
| 6,002,648 A * | 12/1999 | Ambs | B06B 1/0655 181/170 |
| 2003/0160546 A1* | 8/2003 | Osborn | B06B 1/0603 310/369 |
| 2009/0268554 A1 | 8/2009 | Armstrong | |
| 2012/0051188 A1 | 3/2012 | Graber | |
| 2013/0148822 A1* | 6/2013 | Bithell | H04R 3/04 381/97 |
| 2013/0160546 A1* | 6/2013 | Kim | G01C 19/56 73/504.12 |

OTHER PUBLICATIONS

Woollett, Ralph S.; "Underwater Helmholtz-Resonator Transducers: General Design Principles", NUSC Technical Report, Jul. 5, 1977.

International Search Report for PCT Application No. PCT/EP2014/073325, dated Apr. 9, 2015.

International Search Report for PCT Application No. PCT/EP2014/073326, dated Apr. 29, 2015.

* cited by examiner

MODULAR PROJECTOR FOR MARINE SEISMIC SOURCE

CROSS-REFERENCE TO RELATED APPLICATIONS

This application is a US national phase of PCT/EP2014/073325 filed Oct. 30, 2014. The PCT/EP2014/073325 application claims the benefit of Provisional Patent Application Nos. 61/898,234, 61/898,245, and 61/898,246, all filed Oct. 31, 2013. All these applications are hereby incorporated by reference in their entireties.

BACKGROUND

In the oil and gas exploration industry, various techniques of marine geophysical surveying are commonly used in the search for subterranean formations. Marine geophysical surveying techniques yield knowledge of the subsurface structure of the Earth, which is useful for finding and extracting hydrocarbon deposits such as oil and natural gas. Seismic surveying and electromagnetic surveying are two of the well-known techniques of marine geophysical surveying. Seismic surveying and electromagnetic surveying may be used separately or jointly in a survey operation.

During a typical marine seismic survey, a marine seismic source may be towed behind a survey vessel at a particular water depth. The marine seismic source may emit acoustic energy waves in a generally downward direction. The downward traveling acoustic waves may travel through a body of water and be reflected by the underlying Earth formations. The reflected acoustic waves may be detected by sensors such as hydrophones, geophones, accelerometers, etc. Information regarding the Earth formations may be derived accordingly.

As marine geophysical operations continue to explore Earth formations beneath increased water depths, there is a need for a marine seismic source having an operating frequency range (e.g., a range between 1 Hz and 10 Hz) that may be applicable to corresponding ranges of operating parameters such as water depths and/or seismic power output.

DETAILED DESCRIPTION

Figure 1:
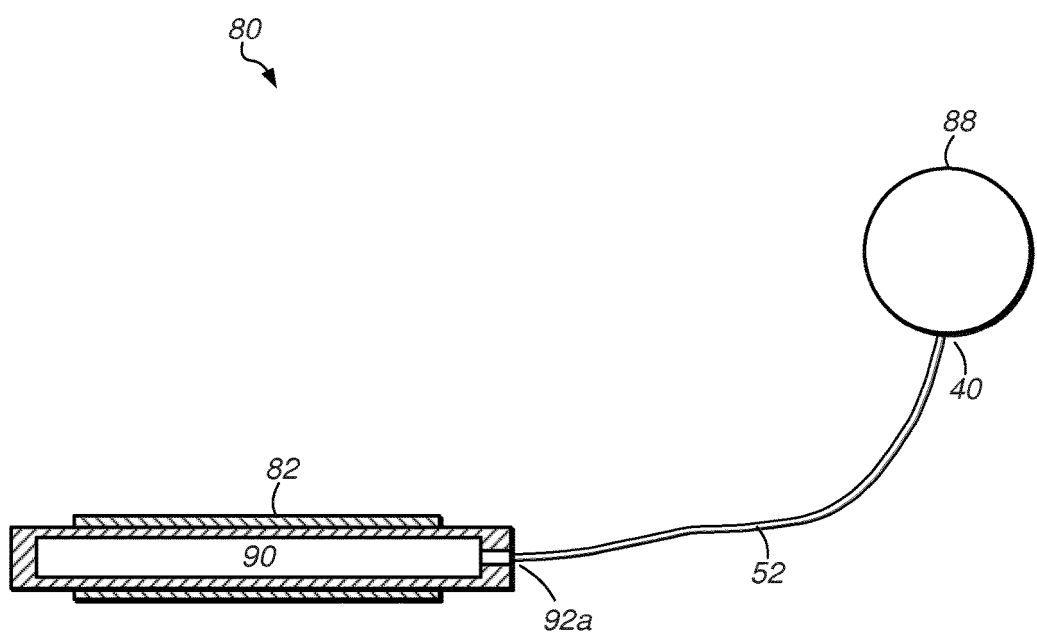
FIG. 1 illustrates an embodiment of a system according to the disclosure herein.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various devices, units, circuits, or other components may be described or claimed as "configured to," "usable to," or "operable to" perform a task or tasks. In such contexts, "configured to," "usable to," and "operable to" are each used to connote structure by indicating that the devices/units/circuits/components include structure that performs the task or tasks during operation. As such, the device/unit/circuit/component can be said to be configured to, usable to, or usable to perform the task even when the specified device/unit/circuit/component is not currently operational (e.g., is not on or in operation). The devices/units/circuits/components used with the "configured to," "usable to," or "operable to" language may include electronic hardware—for example, circuits, memory storing program instructions executable to implement the operation, etc.—mechanical devices, or other types of structure. Reciting that a device/unit/circuit/component is "configured to," "usable to," or "operable to" perform one or more tasks is expressly intended not to invoke 35 U.S.C. § 112(f), for that device/unit/circuit/component.

In a marine seismic survey, which is generally a seismic survey conducted in a marine environment (which may include saltwater, freshwater, and/or brackish water environments), one or more marine seismic sources may be utilized to generate acoustic energy. The acoustic energy may travel downward through the water and through the Earth formations underlying the water bottom. The acoustic impedance boundaries in the Earth formations may reflect, at least in part, the seismic waves that travel through the formations. The reflected seismic wave may in turn travel upwards. Seismic sensors (e.g., hydrophones or geophones) may capture such reflected seismic waves. These seismic sensors may convert the captured seismic waves into signals such as optical or electrical signals. The electrical or optical signals may then be interpreted to provide information both as to the composition and the structure of the various subsurface Earth formations under the water bottom. Such information may be used, for example, to determine the possibility that such Earth formations may contain mineral deposits including hydrocarbons.

One type of marine seismic source often used in marine geophysical surveying operations includes an impulsive type source such as an air gun, or an array of air guns. The frequency content of such sources is generally controllable only to a small degree, principally by altering the charge chamber sizes in an air gun array. The impulsive type marine seismic sources generally produce a limited acoustic energy output in a frequency range of about 1-10 Hz. Particularly over frequency ranges such as about 1 Hz to 5 Hz, about 3 Hz to 10 Hz, and/or about 3 Hz to 5 Hz, the acoustic energy output of the impulsive type sources is generally considered limited.

Another type of marine seismic source may include an acoustic vibratory source. Such a source may include certain pneumatic or hydraulic components. A typical acoustic vibratory source may employ piezoelectric or magnetostrictive material. Acoustic vibratory sources are generally known for better frequency control than the impulsive type of sources. The acoustic vibratory sources may produce a limited acoustic energy output at a frequency range of about 1-100 Hz. Both types of marine seismic sources may be employed in a marine seismic survey.

In an acoustic vibratory source that includes a piezoelectric component, mechanical vibration of the acoustic vibratory source may be created by applying a voltage to the piezoelectric component. The electric field created may cause the piezoelectric material to deform in proportion to the voltage, and the deformation may be used to create vibrations in the vibratory source. The inverse may also occur. A force, such as that created by an acoustic wave, may create a deformation in the piezoelectric material, and this deformation may in turn create an electric field. When used in this fashion, the device is frequently called a hydrophone.

FIG. 1 illustrates a non-limiting embodiment of system 80. System 80 may include marine seismic source 82. Marine seismic source 82 may include various types of acoustic vibratory sources, sound projectors, and other such devices.

Figure 2A:
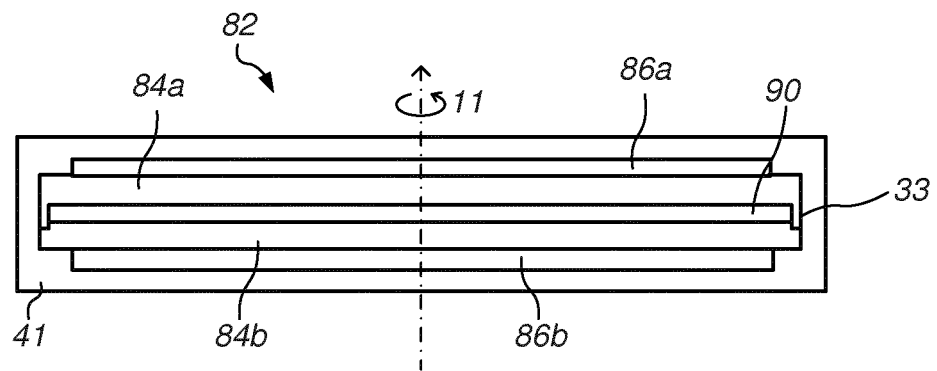
FIG. 2A illustrates a cross-sectional view of a marine seismic source according to an embodiment of the disclosure herein.

A cross-sectional view of a non-limiting embodiment of marine seismic source 82 is illustrated in FIG. 2A. As shown, marine seismic source 82 may be in the form of an electromechanical device such as a "bender" (may also be called a "flexural-disc projector"). In some embodiments, marine seismic source 82 may include flexible waterproof material 41 (e.g., plastic or rubber). In other embodiments, however, flexible waterproof material 41 may be omitted from marine seismic source 82. However, the disclosure is not limited to marine seismic source 82 being an electromechanical device or a bender. Marine seismic source 82 may include other types of seismic vibratory sources, sound projectors, and other such devices.

In this particular embodiment, marine seismic source 82 may include components such as a pair of discs 84a and 84b. Discs 84a and 84b may each be of a circular shape, an elliptical shape, or another shape. Discs 84a and 84b may be made from a material with suitable properties such as stiffness, corrosion-resistance, density, etc., such as metal (e.g., aluminum, steel, etc.). Discs 84a and 84b may be made from a same material in one embodiment. Yet in another embodiment, discs 84a and 84b may be made from different materials that exhibit such suitable properties. According to some embodiments, discs 84a and 84b may be in the range of about 60-80 cm in diameter. According to one embodiment, they may be about 70 cm in diameter.

Marine seismic source 82 may also include components such as a pair of piezoelectric components 86a and 86b. Piezoelectric components 86a and 86b may be made from a ceramic material or other materials exhibiting piezoelectricity. Piezoelectric components 86a and 86b may each be in a circular shape, an elliptical shape, or another shape, either contiguous or non-contiguous. According to some embodiments, piezoelectric components 86a and 86b may be in the range of about 50-70 cm in diameter. According to one embodiment, they may be about 60 cm in diameter. According to some embodiments, piezoelectric components 86a and 86b may be approximately about 30-40 mm in thickness.

Figure 2B:
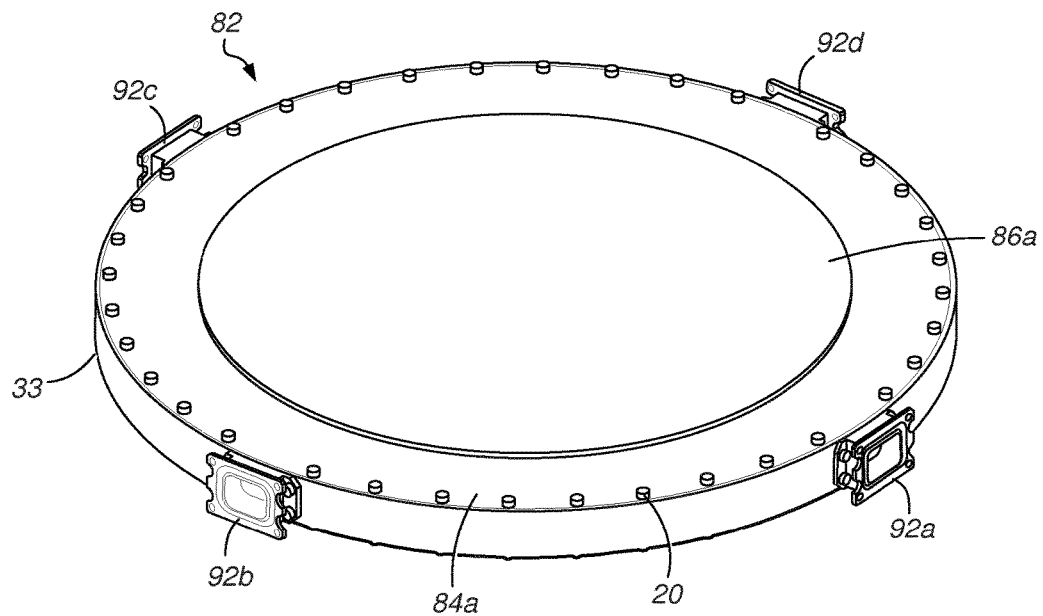
FIG. 2B illustrates a top view of a marine seismic source according to an embodiment of the disclosure herein.
Figure 2C:
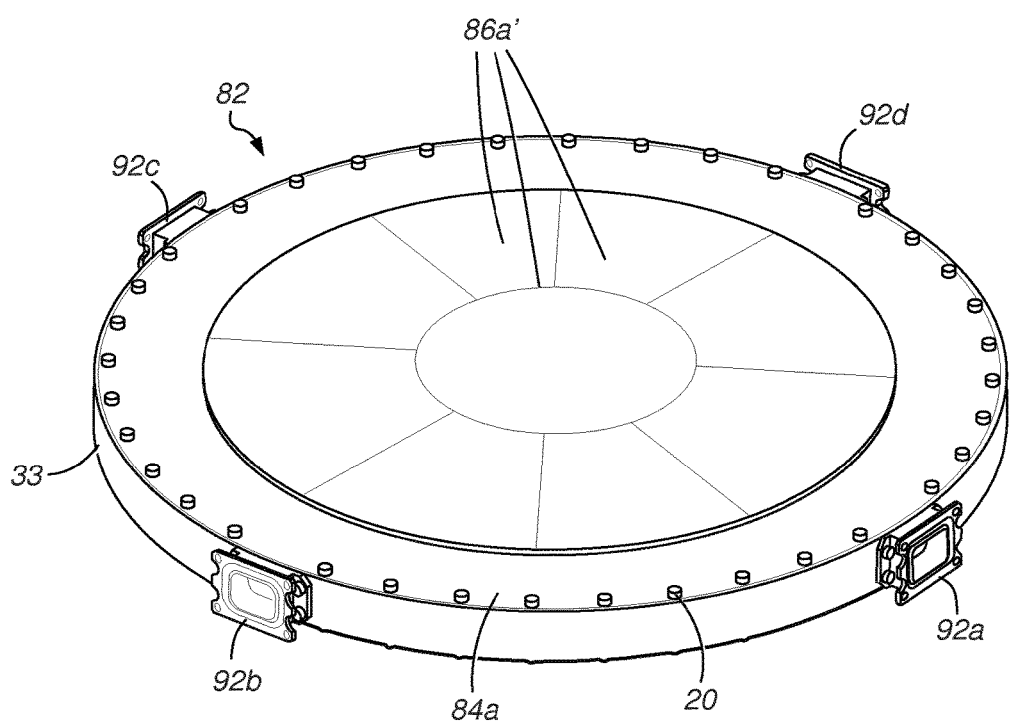
FIG. 2C illustrates a top view of a marine seismic source according to an alternative embodiment of the disclosure herein.

According to some embodiments, for example as shown in FIG. 2C, either or both of piezoelectric components 86a and 86b may be formed in separate segments (e.g., segmented piezoelectric components 86a' in FIG. 2C). Piezoelectric components 86a and 86b may be made from the same piezoelectric material or different piezoelectric materials. In the embodiment illustrated in FIG. 2A, the areas of piezoelectric components 86a and 86b may be smaller than areas of discs 84a and 84b. A total mass of marine seismic source 82 would typically include a mass of discs 84a and 84b and a mass of piezoelectric components 86a and 86b.

Piezoelectric component 86a may be attached to disc 84a, and piezoelectric component 86b may be attached to disc 84b. In one particular embodiment, piezoelectric component 86a may be attached to disc 84a by an adhesive such as glue, epoxy, or other similar components. However, there is no limitation as to how piezoelectric components 86a and 86b may be attached to discs 84a and 84b, respectively. As used herein, the words "attach," or "attached" and other derivations thereof mean a connection between components, whether direct or indirect.

A pair of discs 84a and 84b (having, for example, one or more attached piezoelectric components 86a and 86b) may be held together to form cavity 90 between the discs. Cavity 90 is included in marine seismic source 82. In one non-limiting embodiment, discs 84a and 84b may be secured together by hoop 33 illustrated in FIG. 2A. In that embodiment, hoop 33 may be secured to discs 84a and 84b by one or more bolts 20 illustrated in FIGS. 2B-2D. Cavity 90 may be bounded by the pair of discs 84a and 84b and held in place by hoop 33 that is included in marine seismic source 82. Hoop 33 may be configured to maintain a separation (e.g., a gap) between the pair of discs 84a and 84b (having, for example, the pair of piezoelectric components 86a and 86b) and facilitate a movement of marine seismic source 82. For example, when electric energy is applied to piezoelectric components 86a and 86b, discs 84a and 84b may move or push against hoop 33.

FIG. 2C shows an embodiment similar to that of FIG. 2B, but where piezoelectric component 86a has been replaced by a plurality of segmented piezoelectric components 86a'. Similarly, piezoelectric component 86b may be replaced by a plurality of segmented piezoelectric components 86b' (not shown). The use of segmented piezoelectric components may be advantageous in some embodiments for a variety of reasons. For example, the production of a single, large piece of piezoelectric material (e.g., 60 cm in diameter) may be more difficult and/or costly than the production of several smaller pieces. Further, a single, large piece may be more prone to cracking. The use of segmented piezoelectric components 86a' and 86b' may allow for larger and/or more powerful versions of marine seismic source 82 to be constructed. As discussed elsewhere herein, the diameter of discs 84a and 84b may impact the resonance frequency of marine seismic source 82. Accordingly, the use of such larger versions of marine seismic source 82 may be advantageous for the production of acoustic energy output and vibration amplitude within a desired frequency range (e.g., about 1 Hz to 10 Hz, about 3 Hz to 10 Hz, or about 3 Hz to 5 Hz).

According to some embodiments, segmented piezoelectric components 86a' and 86b' may be connected to discs 84a and 84b with glue or other adhesive. In order to provide a strong bond, it may be advantageous to drill a plurality of through holes in discs 84a and 84b (e.g., 1/16" holes, e.g., with a 1" spacing) in order to allow the escape of air and excess adhesive. Additionally, in some embodiments it may be advantageous to use a mesh to provide air cavities for the glue to escape during clamping.

Figure 2D:
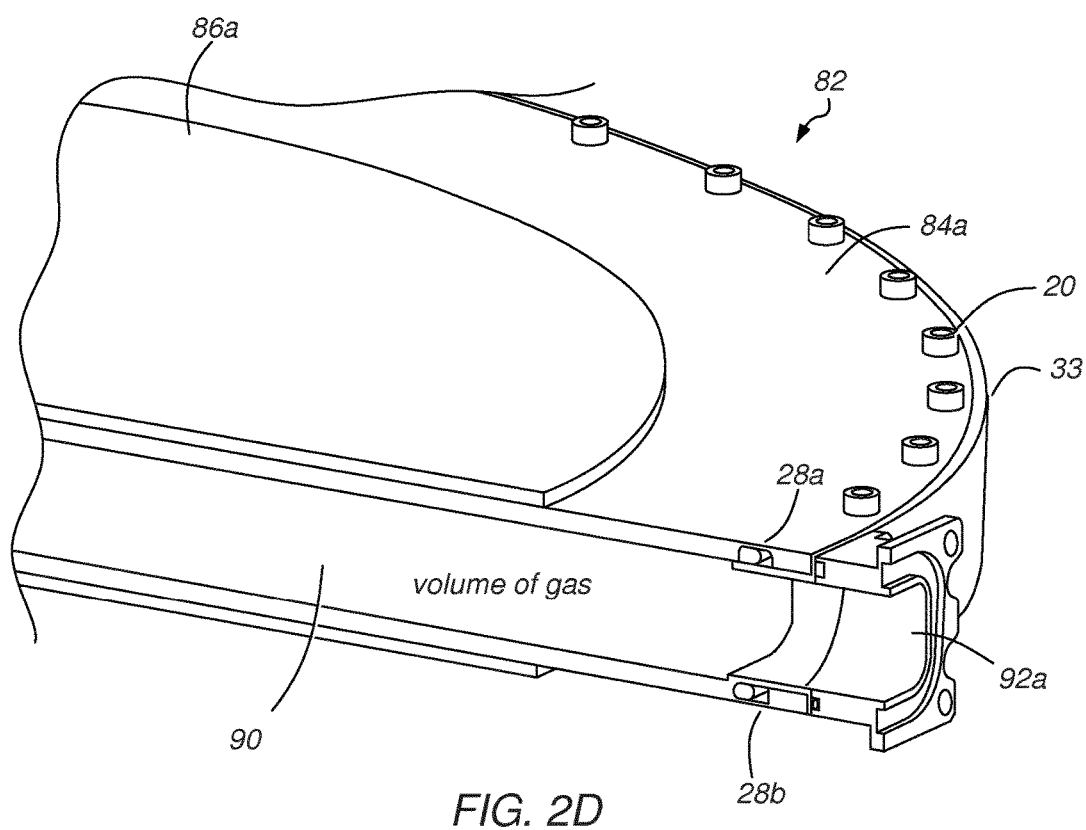
FIG. 2D illustrates a cut-away view of a marine seismic source according to an embodiment of the disclosure herein.

Discs 84a and 84b may be bounded at their respective perimeters. A close-up view in FIG. 2D illustrates that marine seismic source 82 may include o-rings 28a and 28b each configured to provide a respective connection (e.g., a seal) between hoop 33 and the discs. Discs 84a and 84b may be secured at their respective perimeters to hoop 33 by one or more bolts 20 and accordingly form cavity 90. Hoop 33 may include at least one port around its perimeter. In one embodiment, hoop 33 includes ports such as 92a, 92b, 92c, and 92d illustrated in FIG. 2B. These ports may serve as apertures for transporting fluid or gas to and from cavity 90. Each of such ports may be configured to facilitate the resonating gas flow to pass between cavity 90 and gas reservoir 88. In one non-limiting embodiment, ports 92a, 92b, 92c, and 92d may be connected to one another and connected to gas reservoir 88.

Cavity 90 may be configured to contain a volume of gas such as air or other gaseous substances. One of ordinary skill in the art with the benefit of this disclosure will understand that any suitable compressible fluid may be used for these purposes. For the sake of brevity, however, this specification typically refers simply to a "gas." The volume of gas within cavity 90 may be dependent on the volume of cavity 90, which in turn would depend on dimensions of cavity 90 (e.g., diameter, length, height, etc.). A skilled artisan may refer to the volume of gas contained or restricted within cavity 90 as "trapped" gas (in the case that cavity 90 contains a volume of air, it may be referred to as "trapped air," for example) when the volume of gas is not communicative with objects (e.g., another volume of gas) external to cavity 90. The volume of gas contained within cavity 90 may serve, among other purposes, as a compliant medium to reduce any impedance to the vibration amplitude of discs 84a and 84b.

In some embodiments, the volume of gas within cavity 90 may be pressurized. In marine applications, pressurizing and maintaining the volume of gas within cavity 90 at an ambient hydrostatic pressure at an operating water depth may protect marine seismic source 82 from collapsing from the ambient hydrostatic pressure.

In the embodiment illustrated by FIG. 2A, when electric energy (e.g., a sinusoidal voltage) is applied to piezoelectric components 86a and 86b, discs 84a and 84b may bend, flex or otherwise be distorted in proportion to the electric energy (e.g., the sinusoidal voltage), resulting in vibration and acoustic output. In this embodiment, discs 84a and 84b may bend, flex, or otherwise be distorted axially along axis of symmetry 11.

The vibration of discs 84a and 84b may also cause a dynamic pressure variation in the volume of gas within cavity 90. The dynamic pressure may be greater when the volume of gas within cavity 90 is trapped or restricted (e.g., not communicative with other objects external to cavity 90). The dynamic pressure may oppose the vibration of discs 84a and 84b, and the acoustic energy output of marine seismic source 82 may be reduced.

Returning now to FIG. 1, system 80 may include gas reservoir 88. In the non-limiting embodiment illustrated in FIG. 1, gas reservoir 88 may be disposed external to marine seismic source 82. Gas reservoir 88 may include a cavity or container which may be made from a material such as, without limitation, metal, alloy, or polymer. Gas reservoir 88 may be configured to contain a volume of gas such as air or other gaseous substances. The volume of gas contained in gas reservoir 88 may be of a same or different value of from the volume of gas within cavity 90. The volume of gas may typically depend on a volume of gas reservoir 88, which in turn would be based on dimensions of gas reservoir 88 (e.g., diameter, length, height, etc.).

In the non-limiting embodiment illustrated in FIG. 1, gas reservoir 88 may include aperture 40. Yet in other embodiments, gas reservoir 88 may include more than one aperture (not shown in FIG. 1). Aperture 40 may or may not include a valve or other device that may regulate, direct, or control the flow of gas to and from gas reservoir 88. In the embodiments in which gas reservoir 88 may include more than one aperture, any number of valves may be included, or valves may be omitted entirely.

Gas reservoir 88 and marine seismic source 82 may be coupled. In the non-limiting embodiment illustrated in FIG. 1, gas reservoir 88 and cavity 90 of marine seismic source 82 may be coupled to permit a resonating gas flow to pass therebetween. As a result of such coupling, the volume of gas within gas reservoir 88 may be in fluid communication with the volume of gas within cavity 90. A total volume of gas within system 80 may include the volume of gas within cavity 90 and the volume of gas within gas reservoir 88.

In the embodiment illustrated in FIG. 1, marine seismic source 82 (by way of cavity 90) and gas reservoir 88 may be coupled via conduit 52. One end of conduit 52 may be coupled to cavity 90. For example, one end of conduit 52 may be coupled to port 92a of cavity 90 illustrated in FIG. 1. The other end of conduit 52 may be coupled to gas reservoir 88. In one non-limiting embodiment, ports 92a, 92b, 92c, and 92d illustrated in FIG. 2B-2D may be connected to one another which may then be connected to gas reservoir 88.

Conduit 52 may be a hose, a pipe or other suitable tubing. In some embodiments, conduit 52 may have a generally circular cross-sectional area that may be defined by a diameter, while in other embodiments conduit 52 may have a cross-sectional area defined by any other suitable geometry. A volume of conduit 52 may typically depend on dimensions of conduit 52 (e.g., cross-sectional area, length, etc.). More than one conduit 52 may be included in system 80. For example, a plurality of conduits 52 may be arranged in an array. Marine seismic source 82 and gas reservoir 88 may be coupled via the plurality of conduits. For example, FIG. 4A (to be discussed in further detail in other portions of the specification) shows an embodiment in which an array of four conduits 54*a*, 54*b*, 54*c*, and 54*d* join into conduit 52. A total volume of several conduits 52 would typically be based on the dimensions and number of conduits 52. The number of conduits 52 and other components shown in the figures is only for purposes of illustration and is not a limitation on the number of components that may be used in any particular embodiment. Moreover, other shapes, configurations, and geometries of conduit 52 are specifically contemplated and included here.

A total volume of gas within system 80 may be a sum of the volume of gas within conduit 52 and the respective portions of gas within gas reservoir 88 and cavity 90. In other words, the total volume of gas within system 80 may include three portions: a first portion within gas reservoir 88, a second portion within cavity 90, and a third portion within conduit 52.

As discussed above, system 80 may include, either as one form of marine seismic source 82 or as a component included in marine seismic source 82, an electromechanical device that is configured to resonate the volume of gas within system 80 in response to an input of electric energy (e.g., applying a voltage to the electromechanical device or the electromechanical device receiving a voltage). That is, the volume of gas may be resonated within system 80 by the energy imparted to the volume of gas based on the vibration of the electromechanical device. In one non-limiting embodiment, marine seismic source 82 may include at least one piezoelectric actuator. The at least one piezoelectric actuator may be operable to actuate and to cause a resonance in a gas flow passing between cavity 90 of marine seismic source 82 and gas reservoir 88 through conduit 52. In this and other embodiments, a resonance frequency (or resonance) of the volume of gas within system 80 may be dependent on factors including dimensions (e.g., diameter, cross-sectional area, length, etc.) of conduit 52.

Specifically, when marine seismic source 82 includes an electromechanical device, the electromechanical device may include one or more piezoelectric components. The electromechanical device may include, for example, two piezoelectric components such as 86*a* and 86*b* illustrated in FIG. 2A. In some embodiments, it may include more than one piezoelectric device attached to each of discs 84*a* and 84*b*. For example, as shown in FIG. 2C, nine separate segmented piezoelectric components 86*a*' may be attached to disc 84*a*. Similarly, nine (or some other number) of segmented piezoelectric components 86*b*' may be attached to disc 84*b*.

Upon piezoelectric components 86*a* and 86*b* receiving electric energy, the electromechanical device may vibrate. Marine seismic source 82 may operate (e.g., be driven) at a frequency of the electric energy. The vibration may cause the volume of gas within cavity 90 to flow in and out between cavity 90 and gas reservoir 88. When piezoelectric components 86*a* and 86*b* operate (e.g., are driven) at the resonance frequency of the volume of gas flowing between cavity 90 and gas reservoir 88, the dynamic pressure within cavity 90 may peak. The resonance frequency of the volume of gas resonating between cavity 90 and gas reservoir 88 may be determined based on dimensions such as a length and a cross-sectional area of conduit 52. The resonance frequency of the volume of gas resonating between cavity 90 and gas reservoir 88 may also be affected by other parameters. Such other parameters may include a volume of cavity 90, a volume of gas reservoir 88, a length, cross-sectional area and/or quantity of other components in the flow path of the volume of gas (e.g. port 92*a*), and ambient pressure and/or temperature. A suitable choice of these aforementioned parameters may cause marine seismic source 82 to generate acoustic energy at a particular frequency range (e.g., between about 3 Hz and 10 Hz). The particular frequency range would in turn determine a range of corresponding advantageous water depth for operating marine seismic source 82. For example, when marine seismic source 82 is operating at a frequency of 5 Hz, the wavelength of an acoustic wave may be approximately 300 meters (e.g., based on a sound velocity in water of approximately 1,500 m/s), and an advantageous operating depth may therefore be approximately wavelength/4 or approximately 75 meters. For example, an operating range in this case may be between about 50 and 100 meters. According to some embodiments, a plurality of marine seismic sources may operate at a plurality of different depths. In such an embodiment, each of the plurality of marine seismic sources may operate at a frequency selected based upon its respective operating depth.

Figure 3A:
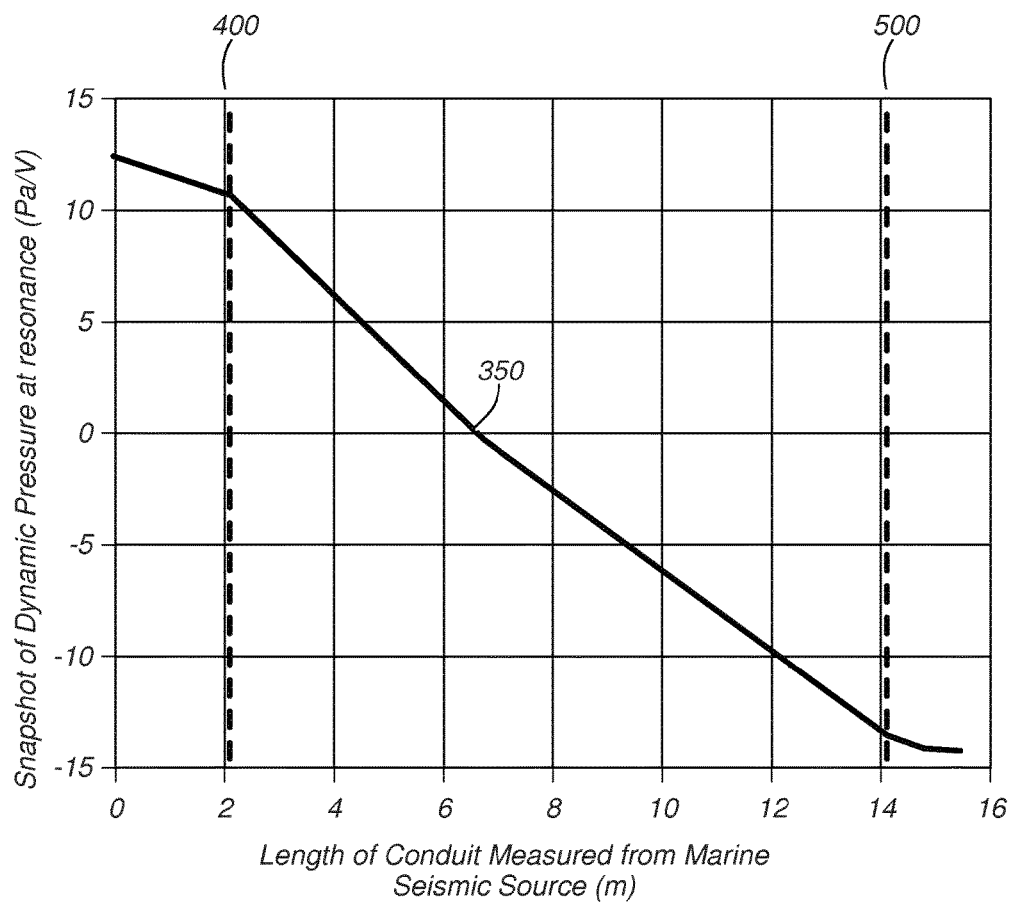
FIG. 3A illustrates a plot based on computer simulation of data correlating dynamic pressure and a distance of conduit from a marine seismic source according to an embodiment of the disclosure herein.

The graph illustrated in FIG. 3A shows operating parameters for a particular non-limiting embodiment of system 80 based on computer simulation data. FIG. 3A illustrates curve 350 which indicates a dynamic pressure in conduit 52 (y-axis) as a function of a length of conduit 52 (x-axis) when system 80 is operating at a resonance frequency of 3 Hz, at an instant in time in which the magnitude of the pressure is maximum. The dynamic pressure may vary sinusoidally with time. Curve 350 may be interpreted to show that a total length of conduit 52 starts at x=0 and ends at just over 14 meters. Lines 400 and 500 demarcate respective ends of conduit 52 (e.g., an end that is configured to couple to marine seismic source 82 indicated by line 400 and another end that is configured to couple to gas reservoir 88 indicated by line 500). In the particular configuration that corresponds to the graph illustrated in FIG. 3A, each end of conduit 52 may be coupled to marine seismic source 82 or gas reservoir 88 via a respective pipe segment such as a 6" pipe segment. Curve 350 may be interpreted to show that the dynamic pressure within system 80 passes through zero within the total length of conduit 52. The varying particular dynamic pressure may be interpreted to indicate that marine seismic source 82 is under pressure when gas reservoir 88 is under a partial vacuum. In other words, FIG. 3A indicates that the volume of resonating gas may "slosh" back and forth between marine seismic source 82 and gas reservoir 88. FIG. 3A may be interpreted to show that a resonance of the volume of resonating gas within system 80 may be approximated as cross-sectional area of conduit 52 proportional to $$\sqrt{\frac{\text{cross-sectional area of conduit 52}}{\text{length of conduit 52}}}.$$

In other words, FIG. 3A may be interpreted to show that, given a particular change in a ratio of a cross-sectional area and/or a length of conduit 52, a corresponding change in the resonance of the volume of gas within conduit 52 may be approximated or determined. In other words, a particular resonance of the volume of gas may be varied for system 80 by varying a cross-sectional area and/or a length of conduit 52.

When coupled via conduit 52, cavity 90 and gas reservoir 88 may be pressurized to reach a certain pressure. In some embodiments, cavity 90 may include a volume of gas at a pressure greater than a static pressure at the particular water depth. In other embodiments, however, cavity 90 may include a volume of gas at a pressure less than a static pressure at the particular water depth. In other embodiments, an amount of overpressure or underpressure within cavity 90 and/or gas reservoir 88, when compared to an ambient static or hydrostatic pressure, may be constrained regardless of the particular water depth, for example, up to +−0.3 bar. Certain embodiments of marine seismic source 82 that include piezoelectric components may be less tolerant of tension than of compression. For one of these embodiments, a pressure within cavity 90 and gas reservoir 88 may be near a hydrostatic ambient pressure so that the pressure is no more than about 0.2 bar less than the ambient pressure.

A sound projector such as marine seismic source 82 may generate acoustic energy at a particular frequency range (e.g., a low frequency range between about 1 Hz and 10 Hz, between about 3 Hz and 10 Hz, between about 3 Hz and 5 Hz, etc.). Such a sound projector (e.g., marine seismic source 82) may achieve a particular ratio of power output to sound projector size at a particular mechanical resonance frequency. While a resonance frequency of the volume of gas may be approximated or determined and varied based on varying dimensions of conduit 52, as discussed in more detail above with regard to FIG. 3A, a mechanical resonance frequency of marine seismic source 82 may be specific to a stiffness and a mass (e.g., vibrating mass) of marine seismic source 82.

In general, when diameters of discs 84a and 84b increase and/or thicknesses of discs 84a and 84b decrease, the mechanical resonance frequency of marine seismic source 82 may decrease. This is largely due to a decrease of an overall stiffness of discs 84a and 84b, which may also be expressed as an increase in the mechanical compliance of discs 84a and 84b. (Generally speaking, those skilled in the art may also refer to increasing mechanical compliance as "softness," as opposed to "stiffness.") The more mechanically compliant marine seismic source 82 is, the lower its mechanical resonance frequency may be.

On the other hand, when diameters of discs 84a and 84b increase and/or the mechanical resonance frequency decreases, a stiffness of the volume of gas within cavity 90 may increase relative to the overall stiffness of discs 84 and 84b. An increase in stiffness of the volume of gas within cavity 90 may result in a decrease in the acoustic energy output of marine seismic source 82. In other words, when the stiffness of the volume of gas within cavity 90 increases, it may inhibit the vibration amplitude of discs 84a and 84b and may cause a decrease in the acoustic energy output of marine seismic source 82. Moreover, the stiffness of the volume of gas within cavity 90 may also increase as the internal pressure increases.

Unless a sound projector (e.g., marine seismic source 82) is pressure compensated (e.g., keeping internal pressure including the pressure of the volume of gas within cavity 90 at or near an ambient static or hydrostatic pressure), the sound projector having subsonic resonance frequencies may have survival depths of only a few meters below a water surface. Therefore, as the operating depth increases, the internal pressure within the sound projector (e.g., marine seismic source 82) may increase, with a concomitant increase in stiffness and loss of acoustic energy output.

A maximum sound pressure level of a sound projector (e.g., marine seismic source 82) generally occurs at or near a mechanical resonance of the sound projector. Broadly speaking, sound pressure is a difference, in a given medium, between an average local pressure and a pressure in a seismic wave. A square of this difference may be averaged over time and/or space, and a square root of this average provides a root-mean-square (RMS) pressure value or $P_{rms}$. Sound pressure level is a logarithmic measure indicating a ratio of a given $P_{rms}$ relative to a reference sound pressure or $P_{ref}$. Sound pressure level is typically measured in decibels (dB). In marine applications, a reference pressure $P_{ref}$ is usually 1 micropascal (1 µPa). In mathematical terms, sound pressure level may be calculated by the equation below:

Sound Pressure Level (dB)=20 log($P_{rms}/P_{ref}$)

A transmitting voltage response or TVR of a sound projector (e.g., marine seismic source 82) may be defined as a sound pressure level generated at a range of 1 meter by the sound projector (e.g., marine seismic source 82) for a 1 volt drive of input electric energy. TVR may be measured in a unit of decibels (dB) relative to a reference pressure of 1 micropascal for a 1 volt drive at 1 meter range.

In the embodiment illustrated in FIG. 1, a sound pressure level and/or a TVR level of marine seismic source 82 may depend at least in part on a resonance frequency of a resonating gas flow within system 80. More specifically, when system 80 operates based on the resonance frequency of the resonating gas flow and marine seismic source 82 vibrates, discs 84a and 84b may flex inwardly and outwardly along axis of symmetry 11 (upon receiving electric energy, for example). When discs 84a and 84b flex inwardly (e.g., toward one another along axis of symmetry 11), the volume of gas within cavity 90 may be exiting cavity 90 at such a speed that a partial vacuum may exist within cavity 90. When there is a partial vacuum (relative to an average or overall pressure within system 80) within cavity 90, the acoustic energy output and vibration amplitude (e.g., displacement) of discs 84 and 84b may increase.

When marine seismic source 82 vibrates, discs 84a and 84b may also flex outwardly (e.g., away from one another along axis of symmetry 11) and the volume of gas entering into cavity 90 from gas reservoir 88 may cause the pressure within cavity 90 to increase above its ambient pressure (e.g., ambient static pressure, ambient hydrostatic pressure, etc.). The acoustic energy output of discs 84a and 84b may increase as a result.

When a resonant system is operating at the resonance of the resonating gas flow, the system, such as an embodiment of system 80, would typically operate so that the reactive forces of inertia and stiffness cancel, and the vibration amplitude may be dependent on resistive elements (e.g., frictions in the system).

Figure 3B:
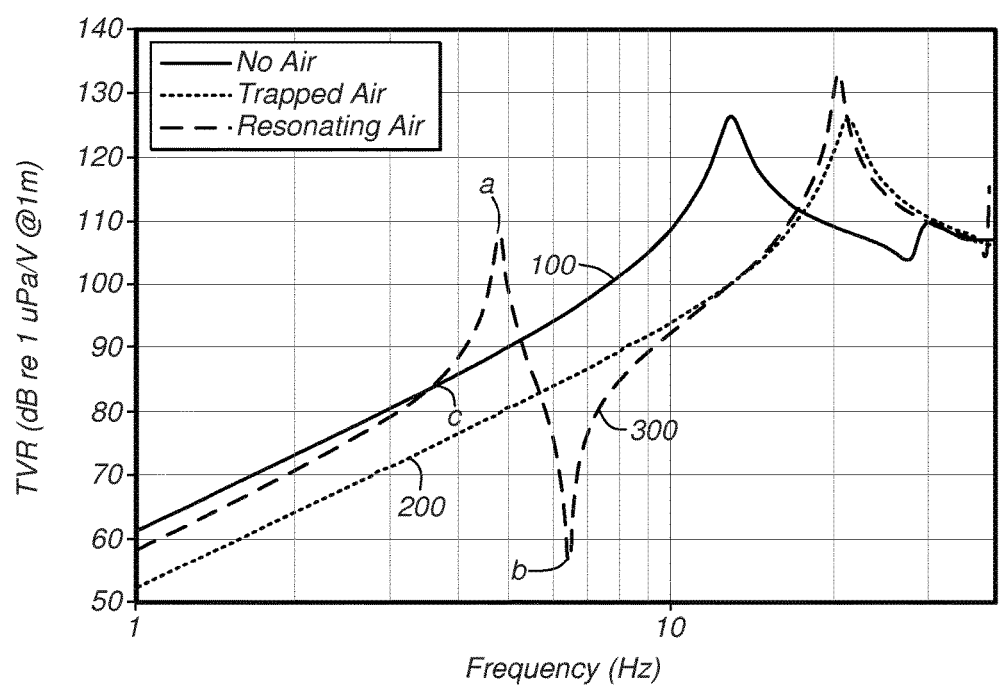
FIG. 3B illustrates a theoretical correlation between certain parameters for various configurations of a marine seismic source which includes a configuration according to an embodiment of the disclosure herein.

FIG. 3B may assist in understanding the operation of a resonant system. FIG. 3B illustrates theoretical operations of marine seismic source 82 under three configurations. The plot in FIG. 3B has an x-axis as a frequency at which marine seismic source 82 is operated and a y-axis as TVR for each configuration. A change in the TVR as a function of frequency for operating each configuration is accordingly shown as curve 100, curve 200, and curve 300 respectively.

Curve 300 illustrates the operation of marine seismic source 82 having a volume of gas (air in this case) within cavity 90 coupled to gas reservoir 88 by way of conduit 52, between which a resonating gas flow (a resonating air flow) may pass (e.g., as described above with respect to one embodiment of system 80). Based on an embodiment in which conduit 52 has a particular cross-sectional area and a particular length, the resonance of the resonating gas flow in this configuration may be at approximately 5 Hz.

FIG. 3B illustrates two other configurations of marine seismic source 82: a first in which cavity 90 is at a vacuum (e.g., illustrative of an operating state in which a volume of gas or air may have little or no effect on the TVR), and a second having a volume of gas (air in this case) that is trapped within cavity 90 (e.g., the volume of gas is restricted within cavity 90, or not communicative with objects external to cavity 90).

Curve 100 corresponds to a configuration in which cavity 90 is at a vacuum (e.g., illustrative of an operating state in which a volume of gas or air may have little or no effect on the motion of discs 84a and 84b), or the "no-air" case. Curve 100 indicates, for example, a slope of the TVR is 12 dB/octave at frequencies well below resonance (e.g., 1 Hz), and increases as the frequency nears the mechanical resonance frequency of marine seismic source 82, which is indicated to peak at about 12 Hz in FIG. 3B. Marine seismic source 82 is generally stiffness-controlled (e.g., the stiffness of the marine seismic source is a dominant factor during operation) up to its fundamental resonance whereas marine seismic source 82 is generally mass-controlled (e.g., the mass of the marine seismic source is a dominant factor during operation) above the fundamental resonance. Thus near a particular frequency below the fundamental resonance, for example, at a frequency of 3 Hz, the vibratory amplitude of discs 84a and 84b, and hence the TVR, is controlled by the stiffness of marine seismic source 82 and of the volume of gas.

Curve 200 corresponds to a configuration in which a volume of gas (air) is trapped within cavity 90, or the "trapped air" case. Because the volume of gas is restricted within cavity 90 and cannot escape or communicate with objects external to cavity 90, the volume of gas may be compressed when discs 84a and 84b move axially inward. A concomitant increase in an internal pressure may therefore impede the motion of discs 84a and 84b. Such impedance may result in a decreased vibration amplitude of discs 84a and 84b, which may lead to a decreased radiation of acoustic energy. In the "trapped air" case, a mechanical resonance frequency of marine seismic source 82 may be greater than that of the "no-air" case because the stiffness of discs 84a and 84b may be augmented by the stiffness of the trapped air. The fundamental resonance for this "trapped air" configuration is indicated at a peak of 20 Hz. Curve 200 indicates that the acoustic power output at 1 Hz is about 10 dB less than the acoustic power output indicated in curve 100, which is a factor of 10 in power (e.g., a change of 3 dB is a factor of 2 in power and 20 dB is a factor of 100). A loss in acoustic power output may increase when a volume of cavity 90 decreases. A loss in acoustic power output may also increase when an operating depth is increased. In other words, the stiffness of the volume of air within cavity 90 may be varied by varying either or both of these parameters.

Curve 300 corresponds to a configuration of marine seismic source 82 in which a resonating gas flow (air, in this case) may pass between cavity 90 and gas reservoir 88 (that is, marine seismic source 82 is in fluid communication with gas reservoir 88). When operating at a frequency below the resonance frequency of the resonating gas, the volume of gas may move in phase with discs 84a and 84b (e.g., near 0 degree phase), and whether the volume of gas is contained within cavity 90 or within gas reservoir 88 may therefore have little or no effect on the movements of the discs. When operating below resonance, an inward movement of discs 84a and 84b may not create a pressure as high as that indicated by curve 100. A decrease in TVR at low frequencies (e.g., 1 Hz) may therefore be less as indicated by curve 300.

On the other hand, when the frequency increases in curve 300 and approaches the resonance of the resonating gas flow, the volume of gas may be energized by the movements of discs 84a and 84b. The closer the frequency is to the resonance of the resonating gas, the larger the volume of gas may be exiting cavity 90. When the system is operated at resonance, an amplitude of a movement of the volume of gas may be greatest. The gas movement is at a 90-degree phase relative to discs 84a and 84b.

In FIG. 3B, at the point where curve 300 intersects curve 100 as indicated by "c," the volume of gas may be exiting cavity 90 at a rate sufficient to keep the dynamic pressure at zero (e.g., the gas or air has no effect on the "no-air" TVR). At a greater frequency immediately above the frequency at intersecting point "c," the volume of gas may be exiting cavity 90 at a rate to create a partial vacuum pressure that enhances the movements of discs 84a and 84b.

Relative to curves 100 and 200, curve 300 thus shows a lower local maximum frequency indicated by "a." The local maximum frequency may indicate operating states in which movements of discs 84a and 84b may be facilitated by the resonating gas flow. Curve 300 additionally suggests that, when operating above the resonance frequency of the volume of gas, the dynamic pressure imparted by the volume of gas may impede the motion of discs 84a and 84b. When discs 84a and 84b are flexing inwardly, the gas flow may enter cavity 90 from gas reservoir 88, thereby opposing the motion of discs 84a and 84b. This condition in which the gas flow most opposes the motion of discs 84a and 84b above the resonance frequency may be observed by the trough indicated as "b" in curve 300.

A resonance of marine seismic source 82 or the volume of gas (e.g., air) may create a 180 degree phase shift in whatever is resonating. When phase relative to the drive voltage to system 80 is measured, it is the phase of the volume of gas that determines whether the pressure of the volume of gas may enhance or detract from the TVR. Accordingly, when system 80 is operating at a frequency above the resonance frequency, movements of the volume of gas may be 180 degrees out of phase with the movement of discs 84a and 84b. FIG. 3B illustrates that the motion of discs 84a and 84b at a frequency near a peak of the TVR may be more than 40 dB greater than at a trough of the TVR.

FIG. 3B additionally indicates that curve 300 may at least partially overlap with curve 200 when operating above resonance. This happens in curve 300 because the volume of gas (air in this case) is generally mass-controlled, while marine seismic source 82 remains generally stiffness controlled. At these frequencies (and during a half cycle), an impedance imparted by conduit 52 may be so high that little air may move within conduit 52, which is similar to the "trapped air" configuration indicated by curve 200.

Because marine seismic source 82 is generally stiffness-controlled below its fundamental resonance (e.g., 12 or 20 Hz with respect to curves 100 or 200 indicated in FIG. 3B), its seismic power output may be strongly affected by the stiffness of the gas within cavity 90. Just below the resonance of the volume of gas, the phase (measured against the drive voltage) of the partial vacuum created by the gas rushing out may enhance the vibration amplitude; whereas above the 5 Hz resonance, the phase of the partial vacuum may impede the vibration amplitude. Marine seismic source 82 remains generally stiffness-controlled in these scenarios that correspond to curves 100 and 200. Because marine seismic source 82 is generally stiffness controlled below its fundamental resonance, the pressure of gas within cavity 90 may have a dramatic impact on performance. Due to the phase of the gas flow velocity changing through the resonance of the gas, the dynamic gas pressure may at first assist, and then may detract, from the vibration amplitude of discs 84a and 84b.

As noted earlier, FIG. 3B indicates that the resonance of the volume of gas (air in this case) is approximately at 5 Hz. Just below 5 Hz, the dynamic pressure of the gas may enhance the vibration amplitude of discs 84a and 84b. At 6.5 Hz, however, the dynamic pressure of the gas may have its maximum detrimental effect on the vibration amplitude.

Returning to the embodiment illustrated in FIG. 1, a sound pressure level and/or a TVR level of marine seismic source 82 may depend at least in part on a resonance frequency of a resonating gas flow within system 80. When the resonance frequency of the resonating gas flow within system 80 is near or equal to the operating frequency, marine seismic source 82 may be operable to produce a particular sound pressure level and/or TVR level for a particular water depth.

An advantageous operating depth may be determined based on a frequency of operating system 80. The operating depth may be calculated by λ/4 where λ is a wavelength of the acoustic wave output. As noted above, in one embodiment in which system 80 is operating at a frequency of 5 Hz, the wavelength may be approximately 300 meters (e.g., based on a sound velocity in water of approximately 1,500 m/s), and the advantageous operating depth may therefore be approximately 75 meters. When the marine seismic source is being towed at a particular water depth of 75 meters or deeper below water surface, the volume of gas within system 80 may be pressurized to a pressure at or near an ambient hydrostatic pressure of the water at that particular depth or correspondingly higher.

As discussed above, a resonance frequency of the volume of resonating gas within system 80 may be proportional to $$\sqrt{\frac{\text{cross-sectional area of conduit 52}}{\text{length of conduit 52}}}.$$

Accordingly, a resonance frequency of the gas within system 80 may be adjustable or tunable based on adjusting or varying dimensions (e.g., a cross-sectional area, a length, etc.) of conduit 52. Conduit 52 may include at least one dimension that is adjustable to change, adjust, or tune a resonance frequency of system 80. In the particular configuration of system 80 that corresponds to the graph illustrated in FIG. 3A, the portion of the system 80 between line 400 and line 500 generally includes the portion of conduit 52 that may be adjusted for a change in the resonance. In one embodiment, the dimension that is adjustable may include a length of conduit 52. In other embodiments, the dimension that is adjustable or tunable may include a width, a diameter, a cross-sectional area, or other dimensions of conduit 52, or combinations of any of these dimensions.

Figure 3C:
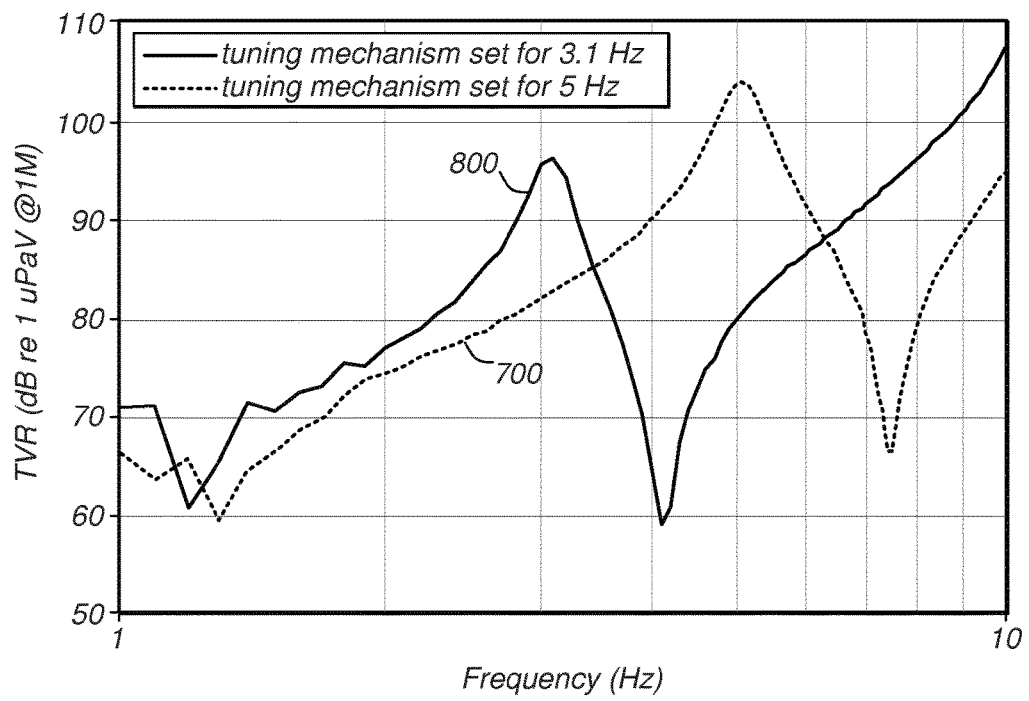
FIG. 3C illustrates a plot for empirical data correlating certain parameters for an operation of an embodiment of the disclosure herein.

FIG. 3C illustrates empirical operating data for an embodiment of marine seismic source 82 at two resonance frequencies of the gas (air in this case), 3.1 Hz and 5 Hz. In FIG. 3C, the x-axis corresponds to a frequency at which marine seismic source 82 is operated and the y-axis corresponds to TVR. FIG. 3C illustrates that the air resonance for curve 800 is at about 3.1 Hz; the air resonance for curve 700 is at about 5 Hz (which corresponds to FIG. 3B). A change in the TVR as a function of operating frequency for each resonance is accordingly shown as curve 800 and curve 700 respectively. FIG. 3C indicates that when the particular dimensions of conduit 52 are adjusted, the resonance frequency of the resonating gas flow within system 80 may be adjusted as a result. Adjusting or "tuning" the resonance frequency of the resonating gas flow within system 80 may therefore be achievable based on adjustments to the particular dimensions of conduit 52.

Figure 4A:
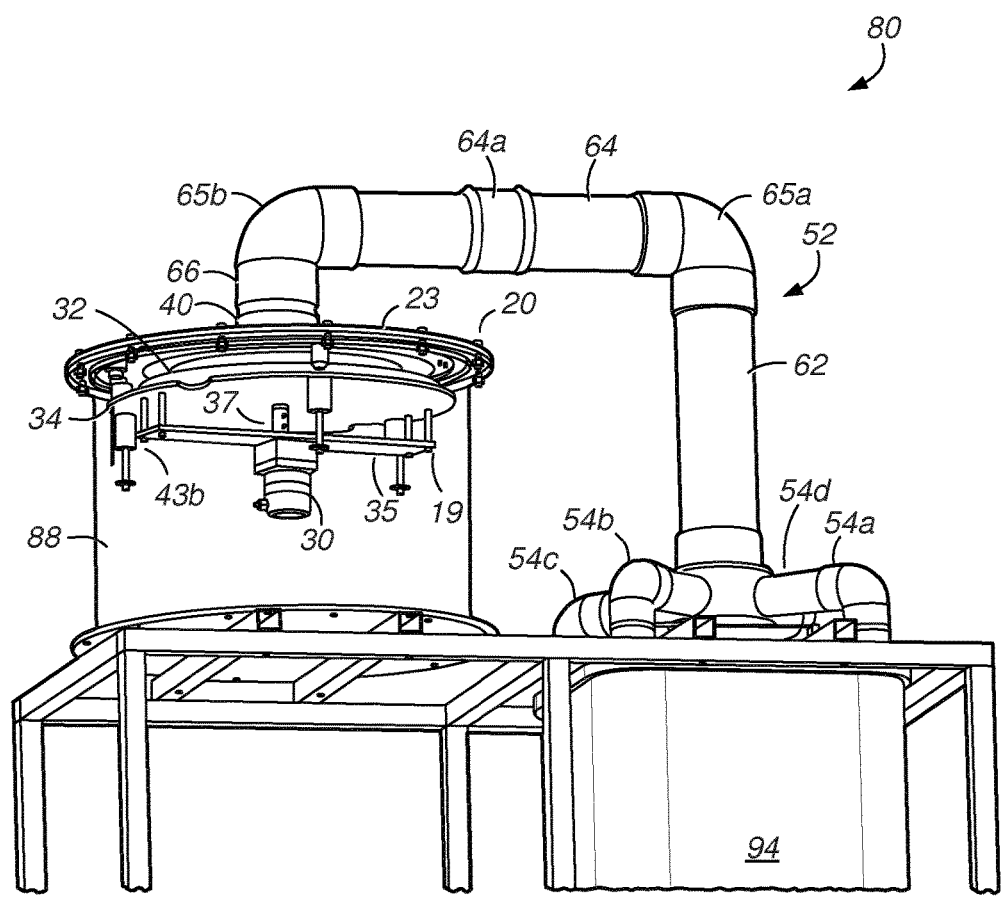
FIG. 4A illustrates an embodiment of a system according to the disclosure herein.

Turning now to FIG. 4A, an alternative embodiment of system 80 is shown, in which marine seismic source 82 (not shown) is housed within apparatus 94. In some embodiments, as discussed in more detail below, apparatus 94 may include a plurality of marine seismic sources 82.

In this particular non-limiting embodiment, conduit 52 may include three pipe segments 62, 64, and 66, each with a diameter of about six inches. In other embodiments, pipe segments 62, 64, and 66 may each have a larger or smaller diameter. In the embodiment shown, pipe segment 64 may include a pipe connector 64a connecting two portions of pipe segment 64. Conduit 52 may additionally include elbows 65a and 65b. In this particular embodiment, pipe segment 62 may be disposed in a vertical orientation above apparatus 94, and elbow 65a may connect pipe segment 62 with pipe segment 64 which may be disposed in a horizontal orientation. Elbow 65b may connect pipe segment 64 with pipe segment 66, which may be disposed in a vertical orientation. Pipe segment 66 may be connected to gas reservoir 88 via aperture 40.

In this embodiment, conduit 52 may include manifold conduits 54a, 54b, 54c, and 54d. Each of manifold conduits 54a, 54b, 54c, and 54d may be connected to each of manifolds 96a, 96b, 96c, and 96d (which are described in more detail with regard to FIG. 6B) of apparatus 94, respectively.

Conduit 52 may include a motor 30 operable to move a portion of conduit 52. Motor 30 may be an electric motor or another type of motor. At least one dimension of conduit 52 may be adjustable in response to the movement caused by motor 30. More specifically, conduit 52 may include first portion 32 and second portion 34. In the embodiment illustrated, second portion 34 (partially shown) may be disposed within gas reservoir 88. First portion 32 (partially shown) may be coupled to and disposed above second portion 34. Motor support 35 and one or more standoffs 19 may be used to position motor 30 to second portion 34. Threaded motor shaft 37 may be attached to motor 30 and pass freely through second portion 34 (additional discussion provided below with regard to FIGS. 4B-4D). Second portion 34 may be coupled to motor 30 by way of at least one motor support 35. First portion 32 may also be coupled to second portion 34 by way of at least one bearing rod 43a (not in view) that corresponds to (e.g., fits inside of) bearing block 43b included in second portion 34 (illustrated in FIGS. 4C and 4D). Cover or lid 23 may be secured around a perimeter of gas reservoir 88 by at least one bolt 20. First portion 32 may be secured to cover or lid 23 (through perforation 17 illustrated in FIG. 4B). When motor 30 operates to move (e.g., up or down from near a top of gas reservoir 88 toward a bottom of reservoir 88) second portion 34 relative to first portion 32, at least one dimension of conduit 52 may be adjustable in response to the movement. In one particular embodiment, the at least one dimension of conduit 52 may be a length of conduit 52. In an alternative embodiment, the at least one dimension may be a cross-sectional area of conduit 52. In yet another embodiment, both the length and the cross-sectional area of conduit 52 may be adjustable in response to the movement. A resonating gas flow may enter/exit gas reservoir 88 through first portion 32 and second portion 34. In the embodiment illustrated, the resonating gas flow may enter aperture 40 and pass through the two portions of conduit 52.

Figure 4B:
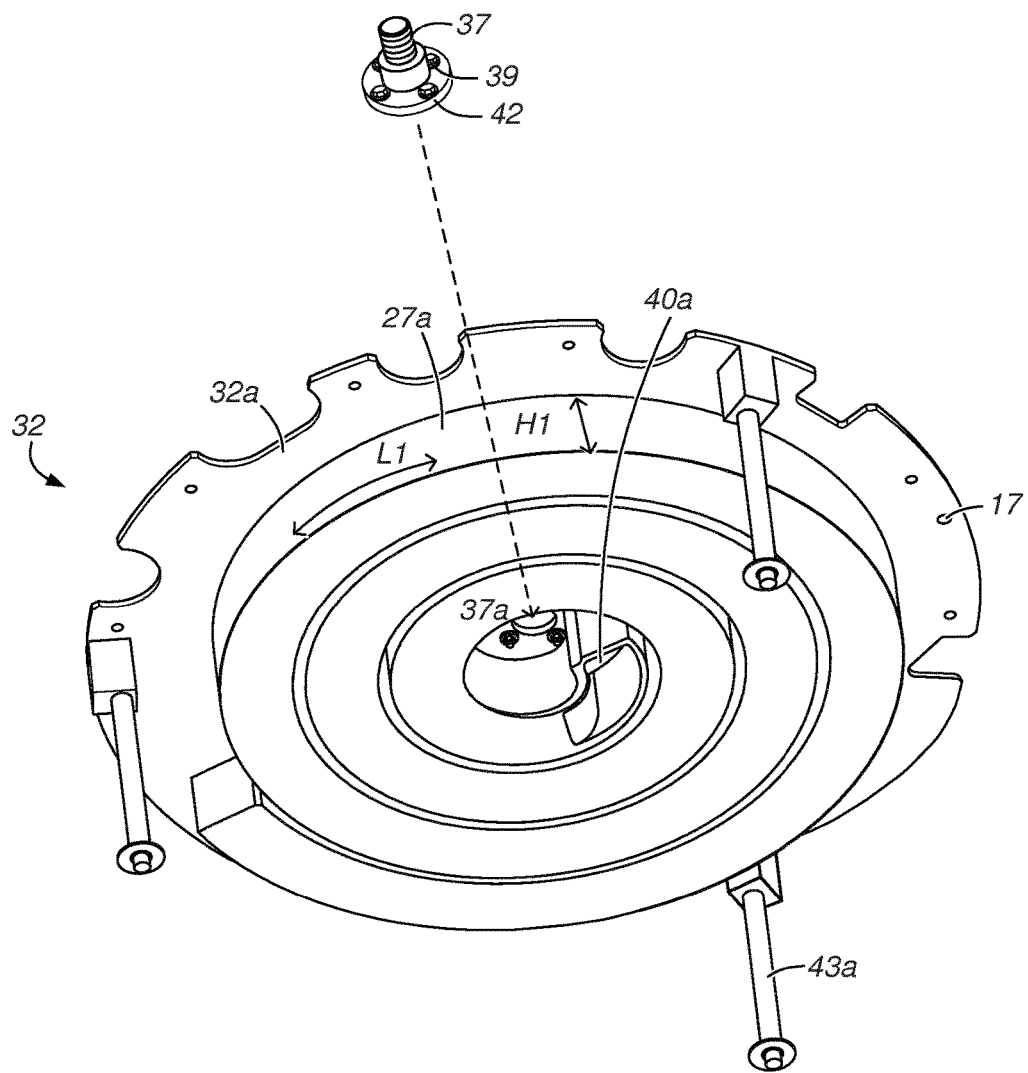
FIG. 4B illustrates a portion of a conduit according to an embodiment of the disclosure herein.
Figure 4C:
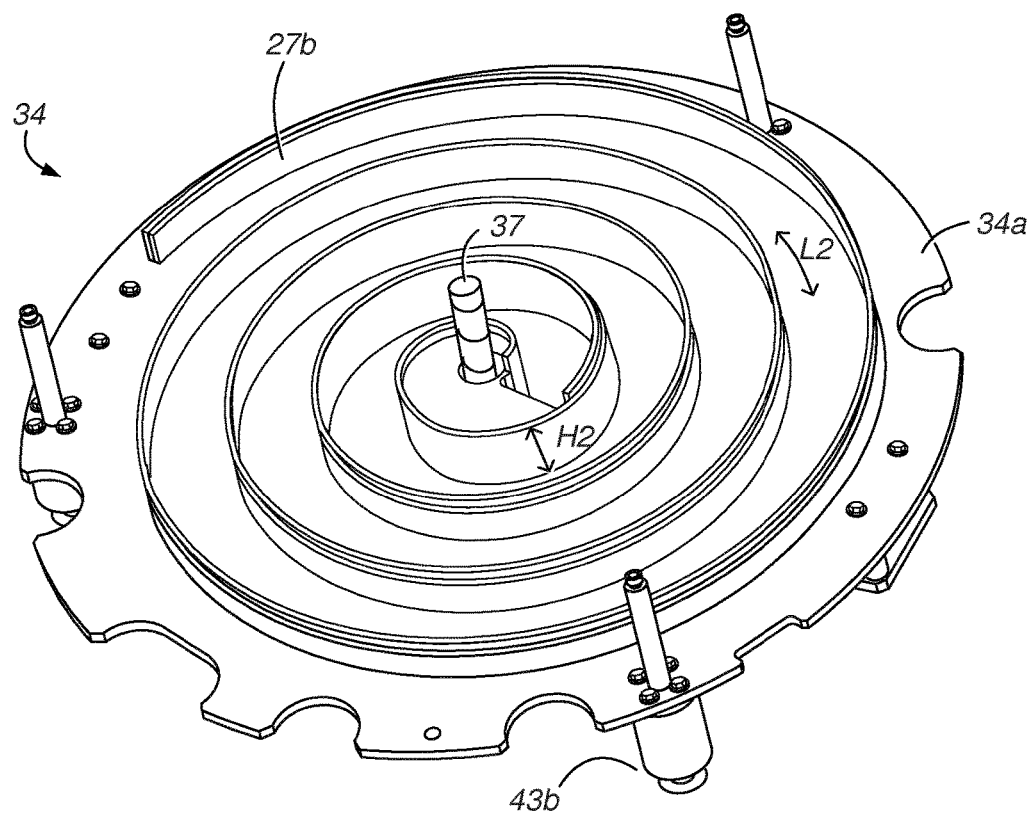
FIG. 4C illustrates one side of another portion of a conduit according to an embodiment of the disclosure herein.
Figure 4D:
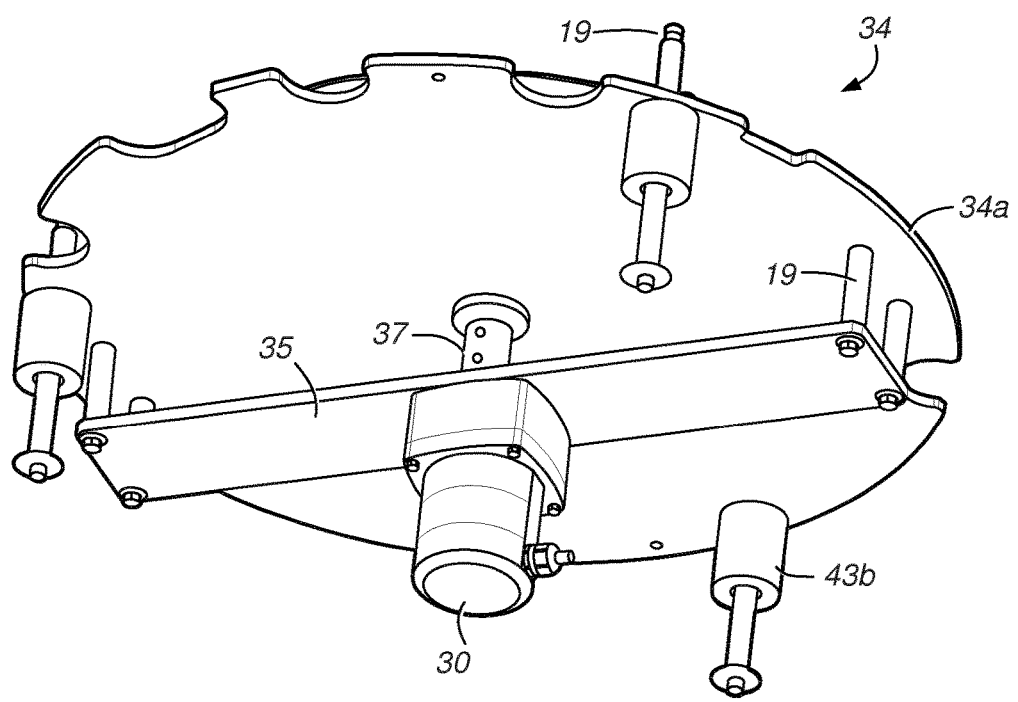
FIG. 4D illustrates another side of the portion illustrated in FIG. 4C.

FIG. 4B illustrates an embodiment of first portion 32, and FIGS. 4C and 4D illustrate an embodiment of second portion 34. First portion 32 may include aperture 40a configured to facilitate a resonating gas flow enter and/or pass through first portion 32. The resonating gas may enter first portion 32 from aperture 40 (illustrated in FIG. 4A). In some embodiments, aperture 40 may incorporate aperture 40a as one structure. In other embodiments, however, aperture 40 and aperture 40a may be two distinct structures.

First portion 32 may include first plate 32a. First plate 32a may be metal or other material. First plate 32a may include a generally round shape with an uneven perimeter although other shapes have been contemplated and expressly included. First plate 32a may include at least one perforation 17. At least one perforation 17 may be configured to facilitate securing first portion 32 (e.g., using at least one bolt 20) to cover or lid 23 illustrated in FIG. 4A. First plate 32a may include threaded nut 39 which may be coupled to second portion 34 via threaded motor shaft 37. Threaded nut 39 may be secured to first plate 32a via collar 42. In the non-limiting embodiment illustrated, threaded nut 39 may receive and secure threaded motor shaft 37 on a side opposite of channel 27a via collar 42 at opening 37a. First portion 32 may also include at least one bearing rod 43a which may be connected to (e.g., fit into) bearing block 43b included in second portion 34 (illustrated in FIGS. 4C and 4D). A connection formed based on bearing rod 43a and bearing block 43b may help stabilize and/or maintain orientation of first portion 32 and/or second portion 34 during operation.

First plate 32a may include channel 27a. A bottom side of channel 27a may be attached to one side of first plate 32a. In a non-limiting embodiment, first plate 32a and channel 27a may be machined from one piece of material. Channel 27a may render first portion 32 a male portion of conduit 52. That is, channel 27a may render first portion 32 a first half of a pair of connectors or fasteners such that the first half may connect to and/or fit into the second half.

A height of channel 27a indicated as "H1" in FIG. 4B may indicate a distance from the bottom side of channel 27a to a top side of channel 27a. A length of channel 27a may be indicated by L1.

Channel 27a may be continuous and may run from an outer perimeter of first plate 32a to a center of first plate 32a. Channel 27a may have a particular length L1 dependent on, for example, a diameter of first plate 32a, or a shape or configuration of channel 27a. In the non-limiting embodiment illustrated in FIG. 4B, channel 27a may be disposed on first plate 32a in a spiral shape. In this embodiment, L1 may be dependent on the number of coils of the spiral shape. In other embodiments, however, other shapes and/or configurations of channel 27a are contemplated and included.

FIG. 4C and FIG. 4D respectively illustrate each side of second portion 34. Second portion 34 may include second plate 34a. Second plate 34a may be metal or other material. Second plate 34a may be of a shape in correspondence with that of first plate 32a. For example, second plate 34a may be of a generally round shape with an uneven perimeter in correspondence with first plate 32a. Other shapes, however, have been contemplated and expressly included. Threaded motor shaft 37 may be attached to motor 30 and may move freely within second portion 34.

Second portion 34 may include channel 27b. A bottom side of channel 27b may be attached to one side of second plate 34a. In a non-limiting embodiment, second plate 34a and channel 27b may be machined from one piece of material. Channel 27b may render second portion 34 a female portion of conduit 52. That is, relative to a first half of a pair of connectors or fasteners, channel 27b may render second portion 34 a second half of the pair for the second half to connect and/or receive the first half.

FIG. 4D illustrates a side of second plate 34a opposite to channel 27b. In the embodiment illustrated, motor support 35 and one or more standoffs 19 may be used to position motor 30 to second portion 34. Threaded motor shaft 37 may receive threaded nut 39 illustrated in FIG. 4B. Second portion 34 may be coupled to motor 30 via motor support 35 and threaded motor shaft 37. Threaded motor shaft 37 may couple motor 30 to a point (e.g., a center portion) of second portion 34 and first portion 32. Motor support 35 may facilitate a movement of second portion 34 based on the operation of motor 30. In an example, threaded motor shaft 37 may turn freely within second portion 34, and threaded nut 39 connected to threaded motor shaft 37 may cause second portion 34 to raise and lower as threaded motor shaft 37 rotates while first portion 32 generally remains stationary. Other mechanisms under which first portion 32 and second portion 34 may be moved relative to one another are contemplated and expressly included in this disclosure. Second portion 34 may also include at least one bearing block 43b that corresponds to bearing rod 43a illustrated in FIG. 4B.

A height of channel 27b indicated as "H2" in FIG. 4C may indicate a distance from the bottom side of channel 27b to a top side of channel 27b. Channel 27b may be continuous and may run from an outer perimeter of second plate 34a to a center of second plate 34a. Channel 27b may have a particular length L2 dependent on, for example, a diameter of second plate 34a and a shape or configuration of channel 27b. In the non-limiting embodiment illustrated in FIG. 4C, channel 27b may be disposed on second plate 34a in a spiral shape. In other embodiments, however, other shapes and/or configurations of channel 27b are contemplated and included. A height, length, shape or configuration of channel 27b may correspond to that of channel 27a. An engagement between channel 27a and channel 27b may facilitate a resonating gas to pass through a channel 27 formed by the mating of first portion 32 and second portion 34 (described in more detail with regard to FIGS. 5A-5C).

In the embodiments illustrated in FIG. 4C, height H2 of channel 27b may vary from a center of second plate 34a to a perimeter of second plate 34a. For example, H2 may decrease from the center of second plate 34a to the perimeter of second plate 34a. Alternatively, H2 may increase or remain constant from the center of second plate 34a to the perimeter of second plate 34a. Height H1 of channel 27a may vary and remain constant in correspondence with a configuration of H2.

Each of first portion 32 and second portion 34 may each include at least one bearing rod 43a and bearing block 43b, respectively. Bearing rod 43a and bearing block 43b may each be configured to facilitate an engagement of the two portions. When second portion 34 is engaged with first portion 32 at a particular configuration, bearing rod 43a and/or bearing block 43b may facilitate to engage and/or align channels 27a and 27b. When first portion 32 and second portion 34 are engaged in a particular configuration, a corresponding engagement of channels 27a and 27b may result in channel 27. At least one dimension of channel 27 may therefore be dependent on the particular engagement/separation of first portion 32 and second portion 34 and dimensions of channels 27a and 27b. When channels 27a and 27b are in spiral shapes, channel 27 may correspondingly be disposed in a spiral shape between first plate 32a and second plate 34a. For example, channel 27 may be formed as a result of at least one gap from an engagement/ separation between the male and female portions of conduit 52 (e.g., corresponding to channels 27a and 27b). Channel 27 may accordingly be a "maze"-like structure. Lengths L1 and L2 and heights H1 and H2 may be parameters associated with at least one dimension of channel 27.

In another embodiment, channel 27 may be formed as a result of a separation based on an engagement/separation between a convex portion and a concave portion of conduit 52 (e.g., corresponding to channels 27a and 27b). In that embodiment, the convex and concave portions may be engaged to form channel 27 between first plate 32a and second plate 34a.

Channel 27 may be configured to couple marine seismic source 82 to gas reservoir 88 external to marine seismic source 82. That is, one end of channel 27 may be configured to couple to marine seismic source 82 (e.g., by way of one end of conduit 52), while the other end of channel 27 may be configured to couple to gas reservoir 88 (e.g., by way of the other end of conduit 52). When channel 27 couples marine seismic source 82 to gas reservoir 88, channel 27 may be operable to allow passage of a gas to flow therethrough.

First portion 32 and second portion 34 may be movably coupled or engaged via motor 30, threaded motor shaft 37 and other components described above with regard to FIGS. 4B-4D. For example, second portion 34 may be movably coupled to first portion 32 facilitated by at least one bearing rod 43a and/or at least one bearing block 43b. In one particular embodiment, first portion 32 and second portion 34 may each include moving seals (not separately shown) to facilitate the coupling and/or engagements between the two portions. In other embodiments, however, moving seals may be omitted for either or both portions.

When second portion 34 is movably coupled to first portion 32 or vice versa, motor 30 may be operable to cause movements of second portion 34 relative to first portion 32 or vice versa. In response to the movements of second portion 34 relative to first portion 32 (or movements of first portion 32 relative to second portion 34), at least one dimension (e.g., a length and/or a cross-sectional area) of channel 27 (and thus of conduit 52) may be adjustable. For example, motor 30 may, by causing second portion 34 to move up or down, cause an adjustment of a configuration (e.g., an engagement and/or separation) between first portion 32 and second portion 34. Adjustments of the configuration between first portion 32 and second portion 34 may change the dimension(s) of channel 27.

Because a particular engagement/separation between first portion 32 and second portion 34 may result in a particular distance through which a resonating gas may travel in channel 27, the distance may be an effective length of channel 27. When marine seismic source 82 and gas reservoir 88 are coupled by way of conduit 52, the resonating gas may pass to/from marine seismic source 82 and gas reservoir 88 over a total distance that includes the effective length of channel 27.

When motor 30 is operable to cause continuous movements between first plate 32a and second plate 34a, the continuous movements may be operable to change the dimension(s) of channel 27 in a continuous manner.

A control system may receive information indicative of at least one dimension (e.g., a length) of channel 27. A linear variable differential transformer, or other means, may be used to provide such information. Based on the information, the control system may transmit operating instructions to motor 30. For example, the control system may instruct motor 30 to cause a movement of second plate 34a relative to first plate 32a (or vice versa) to change the particular engagement/separation between first portion 32 and second portion 34. As a result of the change in the engagement/separation, a length of channel 27 may change from one length to a different length, or the cross-sectional area of channel 27, A1 in FIG. 5A, may change from one cross-sectional area to another cross-sectional area.

In some embodiments, the adjustment amount between first portion 32 and second portion 34 may be determined via a lookup table. A "lookup table," as used herein, may include any array, any database, any matrix, or other similar arrangements usable to cross reference data (e.g., one or numerical values, parameters, attributes, factors, properties, etc.). Generally speaking, a lookup table may relate the values of one or more input parameters to a corresponding output value. In one embodiment, a two-dimensional lookup table may be employed for input parameters including the resonance frequency and operating water depth; the two-dimensional lookup table may relate particular values of these parameters to a corresponding amount of adjustment for at least one dimension of the conduit, such that when specific values of resonance frequency and operating water depth are input to the lookup table, the lookup table may produce a corresponding amount of adjustment for the dimension(s) of the conduit, with the objective of obtaining resonance at specified input parameters.

Upon at least one dimension of the conduit being adjusted, the resonance frequency may change so that it more closely corresponds to the driving frequency (for example, in some cases, the adjustment may render the particular resonance frequency approximately equal to the driving frequency).

Figure 5A:
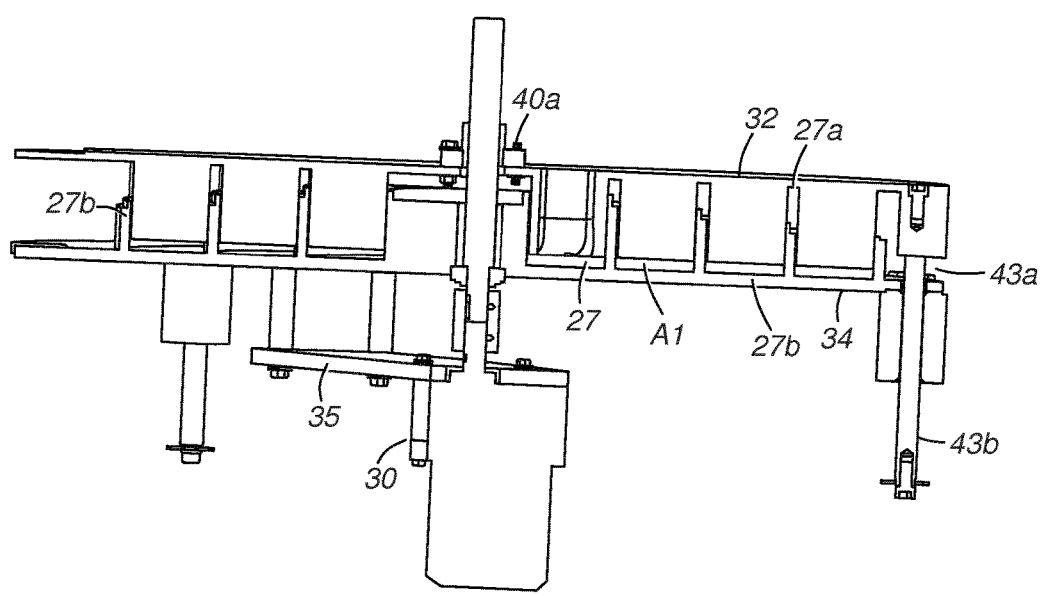
FIG. 5A illustrates a cross-sectional view of a conduit according to an embodiment of the disclosure herein.

Turning now to FIG. 5A, a cross-sectional view of an embodiment is shown in which second portion 34 is fully or nearly fully engaged with first portion 32. As illustrated, channel 27a and channel 27b may be engaged to form channel 27. A resonating gas flow may enter one end of channel 27 through aperture 40a. Upon entering, the resonating gas flow may then move through channel 27 between first portion 32 and second portion 34 until it exits at another end of channel 27. In this particular configuration in which first portion 32 and second portion 34 are fully or nearly fully engaged, a length of channel 27 is approximately a full length of all coils in the spiral. In this configuration, channel 27 may have a smaller cross-sectional area and greater length compared to other configurations. Under this configuration, the resonating gas may pass to/from marine seismic source 82 and gas reservoir 88 through channel 27 having a particular cross-sectional area indicated by "A1" and a particular length that is approximately a full length of all coils. In addition to being dependent on the engagement/separation between first portion 32 and second portion 34, the particular length of channel 27 may depend on L1 and L2 illustrated in FIGS. 4B and 4C. Based on cross-sectional area A1, and the particular length of channel 27, this configuration may result in a particular resonance frequency of the resonating gas.

At least one dimension of channel 27 illustrated in FIG. 5A may be adjusted based on the movements between first plate 32a and second plate 34a. For example, the at least one dimension may include a cross-sectional area and a length. Movements between first plate 32a and second plate 34a may accordingly adjust either or both of these dimensions.

Figure 5B:
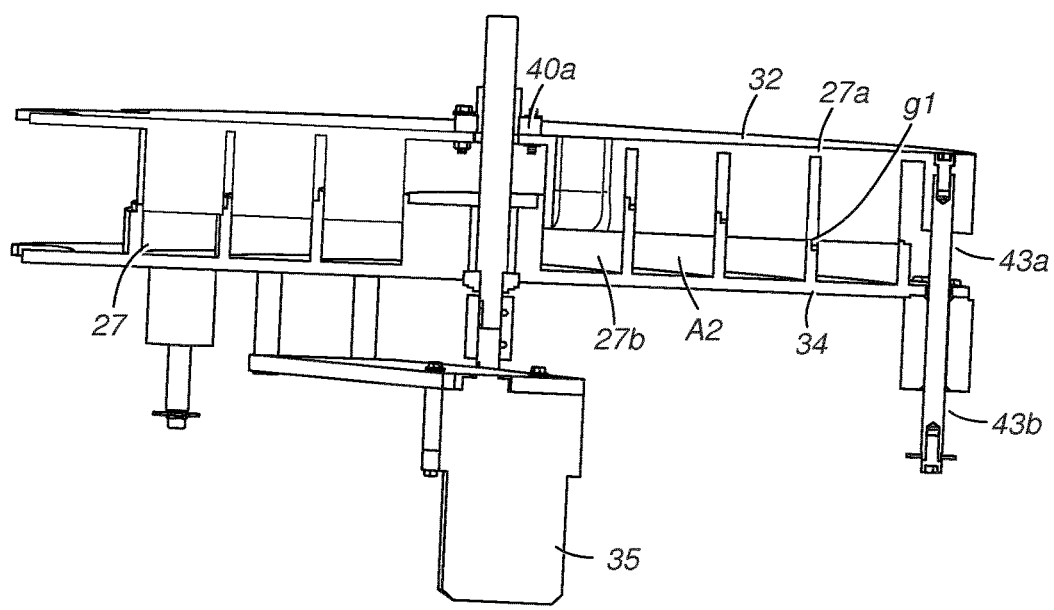
FIG. 5B illustrates a cross-sectional view of a conduit according to another embodiment of the disclosure herein.

FIG. 5B illustrates an embodiment in which the cross-sectional area of channel 27 has been changed to a cross-sectional area indicated as A2. To effect the change in the configuration of engagement from the embodiment illustrated in FIG. 5A to the embodiment illustrated in FIG. 5B, motor 30 may cause movements between first plate 32a and second plate 34a. Because the movements between first plate 32a and second plate 34a may be operable to change at least one dimension of channel 27, a cross-sectional area of channel 27 may be changed from "A1" indicated in FIG. 5A to "A2" in FIG. 5B. In the illustration in FIG. 5B, second portion 34 is now partially engaged with first portion 32. Based on the particular engagement/separation, a length of channel 27 may remain the same as that of the configuration illustrated in FIG. 5A. Unlike the configuration illustrated in FIG. 5A, however, a resonating gas flow may not travel the full length of channel 27. Instead, the resonating gas flow may exit through at least one gap "g1" illustrated in FIG. 5B. As a result of adjusting the cross-sectional area, this illustrated configuration may result in a different resonance frequency of the resonating gas than that of FIG. 5A.

Figure 5C:
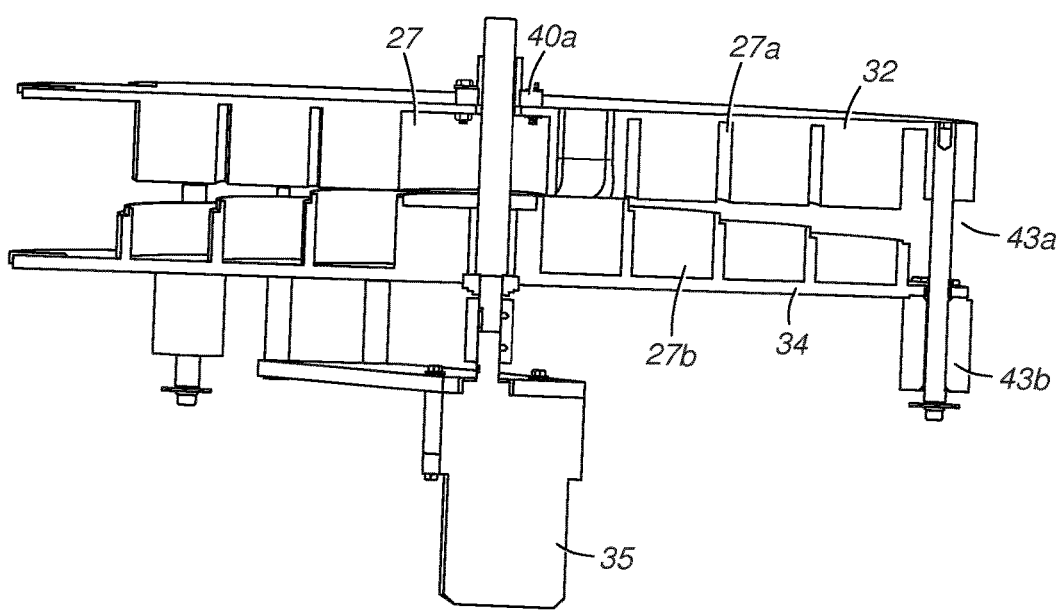
FIG. 5C illustrates a cross-sectional view of a conduit according to yet another embodiment of the disclosure herein.

FIG. 5C illustrates an embodiment in which second portion 34 is fully or nearly fully disengaged from first portion 32. In this configuration, when motor 30 operates causing movements between first and second plates 32a and 34a, two dimensions of channel 27 may be changed as a result. As a result of first portion 32 and second portion 34 being fully or nearly fully disengaged, channel 27 may have a minimal length compared to the configurations illustrated in FIG. 5A and FIG. 5B. The disengagement of the two portions may also result in a cross-sectional area of channel 27 being changed to allow a resonating gas to escape through the disengaged portions starting from the outer perimeter. This configuration may result in yet another different resonance frequency of the resonating gas than those of FIG. 5A and FIG. 5B.

Figure 6A:
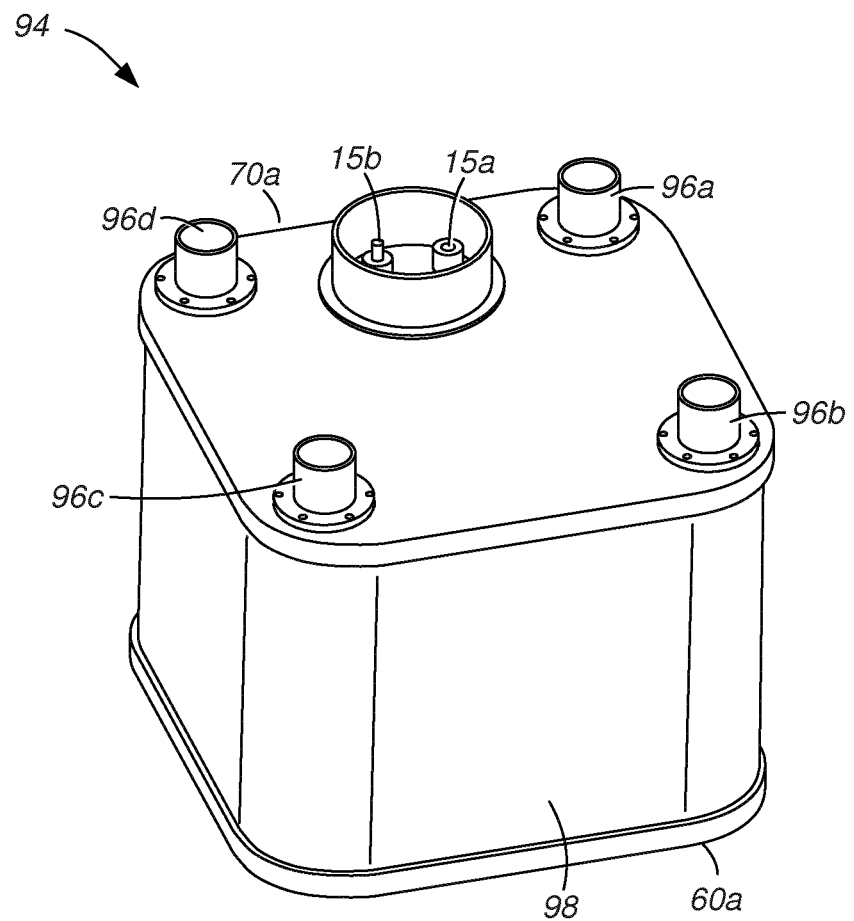
FIG. 6A illustrates an embodiment of an apparatus according to the disclosure herein.
Figure 6B:
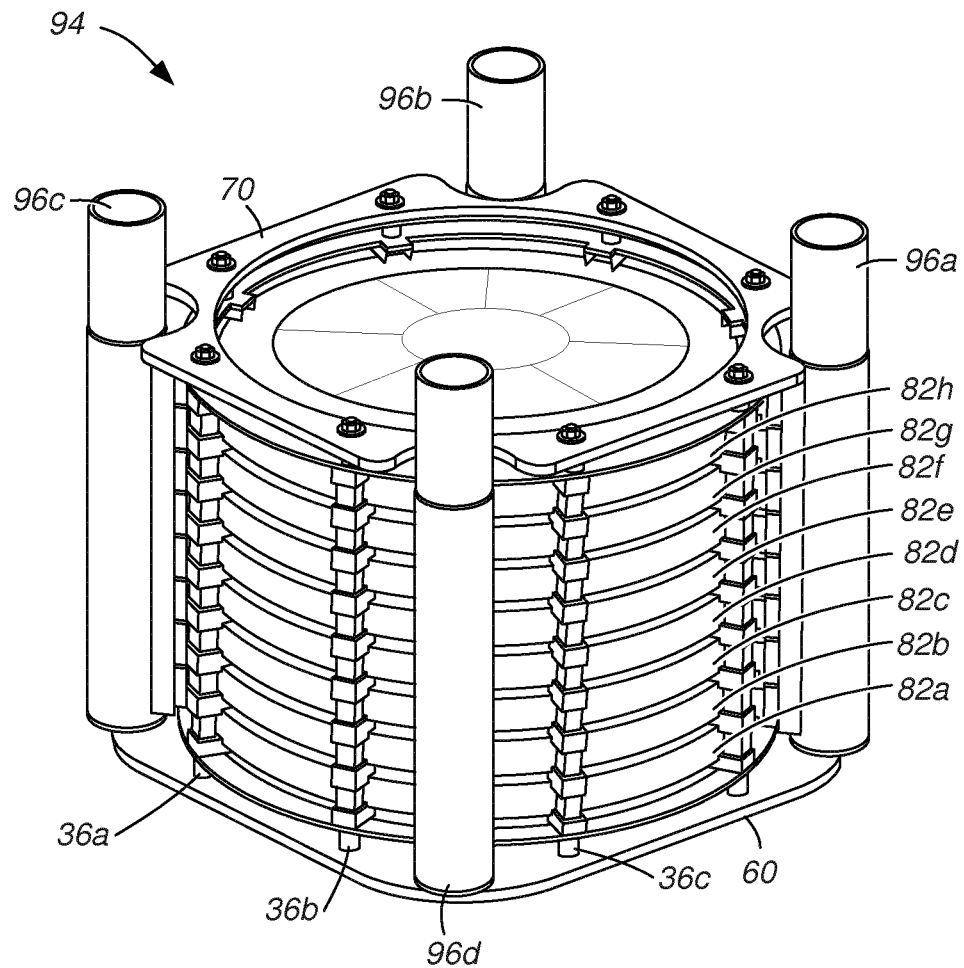
FIG. 6B illustrates a partial assembly of an embodiment of an apparatus according to the disclosure herein.

Some embodiments of existing marine seismic sources may suffer from being a single, complex structure. Possible shortcomings of this approach are lack of power and lack of long-term reliability. For example, producing 200 dB of energy at 3 Hz may require a volume change of $0.5 \text{ m}^3{}_{rms}$ of water. In some embodiments, it may be desirable to produce at least 200 dB of energy; in some embodiments, 195-200 dB may be considered sufficient. In these cases, such a large water displacement may be difficult to achieve with existing designs, and, even if achieved, may cause premature mechanical failure of the sound source. Moreover, there are the many difficulties of operating continuously at 75 m or greater depth (or, for example, in the range of 50 to 100 meters depth). FIGS. 6A and 6B show embodiments of this disclosure that may address some of such shortcomings.

As noted above with regard to FIG. 4A, one or more marine seismic sources 82 may be included within apparatus 94 of system 80. FIG. 6A illustrates a partial embodiment of apparatus 94 and boot assembly 98. Apparatus 94 may include at least one marine seismic source 82 (not in view in FIG. 6A) enclosed by boot assembly 98. Boot assembly 98 may include bottom plate 60a and top plate 70a in which marine seismic source 82 may be enclosed. Apparatus 94 may also include electric connections 15a and 15b which may facilitate electric energy input to piezoelectric components 86a and 86b and/or discs 84a and 84b of marine seismic source 82 (not in view in FIG. 6A). Boot assembly 98 may enclose and/or be disposed around marine seismic sources 82 and manifolds 96a-96d. In one particular embodiment, boot assembly 98 may include an electrically insulating material such as a fluid (e.g., electrically insulating oil) in which marine seismic sources 82 may be immersed or at least partially disposed (not in view). The electrically insulating oil may serve as an additional protective layer for marine seismic sources 82.

FIG. 6B illustrates an embodiment in which an array of marine seismic sources 82a-82h may be arranged in apparatus 94 (boot assembly 98 is not shown). In one embodiment, apparatus 94 may include marine seismic sources 82a-82h in a stack configuration. For purposes of this disclosure, it should be understood that a "stack" of marine seismic sources means that the marine seismic sources are arranged along a common longitudinal axis. For example, marine seismic source 82b may be disposed on top of marine seismic source 82a and marine seismic source 82c may be disposed on top of marine seismic source 82b, and so forth to form a stack configuration of marine seismic sources 82a-82h. Marine seismic sources 82a-82h may be disposed such that they are aligned within apparatus 94. For example, marine seismic sources 82a-82h may be disposed such that they are arranged along a common longitudinal axis. The stack configuration of marine seismic source 82a-82h may be fastened to bottom plate 60a and/or top plate 70a. Apparatus 94 may include one or more support structures 36a, 36b and 36c which may hold marine seismic sources 82a-82h in place within apparatus 94. Apparatus 94 may include one or more manifolds 96a, 96b, 96c, and 96d. Manifold 96a may include a hose, a pipe, or another similar component. In one particular embodiment, each of manifolds 96a-96d may be a pipe or hose segment with a three inch diameter, although other diameters are possible and contemplated.

Thus according to some embodiments of this disclosure, a plurality of marine seismic sources 82a-82h may be arranged in close proximity. Each marine seismic source may produce only a relatively small fraction of the desired overall acoustic power, but because of the quantity of marine seismic sources and their mutual strong interaction, apparatus 94 may be able to produce a useful amount of acoustic energy. In some embodiments, a plurality of apparatuses 94 may be used in conjunction. In other embodiments, a single apparatus 94 with a large number of marine seismic sources may be used. Accordingly, a sound pressure level (SPL) of about 195-200 dB or more at a frequency range of about 3 to 10 Hz at a depth of range of about 50-100 m may be produced. For example, an SPL of up to 203 dB or even more may be attainable at a depth of about 75 meters according to embodiments of this disclosure.

Furthermore, the potential failure of a small number of individual marine seismic sources within apparatus 94 may have at most a minimal impact on acoustic power, which is in contrast to existing approaches. In a single-body projector (i.e., a system 80 comprising exactly one marine seismic source 82), for example, the failure of a critical component may result in complete failure of the system. In some embodiments of this disclosure, however, the failure of an individual marine seismic source may reduce the SPL of the system by less than 1 dB (that is, the SPL of the system after the failure is between 0 dB and −1 dB, or between 100% and 79% of the SPL of the system prior to the failure). In some embodiments, the failure of an individual marine seismic source may reduce the SPL of the system by less than 2 dB (that is, the SPL of the system after the failure is between 0 dB and −2 dB, or between 100% and 63% of the SPL of the system prior to the failure). According to some embodiments, apparatus 94 may be configured to detect (e.g., via a computing system integrated into or coupled to apparatus 94) the failure of an individual marine seismic source. Apparatus 94 may then be configured to increase the power to the remainder of the marine seismic sources that are still operable in order to compensate (or partially compensate) for the failed marine seismic source.

In some embodiments, it may be desirable to have the plurality of marine seismic sources relatively close together, in order to create constructive interference between the energy produced by each marine seismic source, and/or improve the overall efficiency. For example, according to some embodiments, it may be desirable for the marine seismic sources to be within ⅛ of the wavelength of the energy being produced. At 3 Hz, for example, the acoustic wavelength in seawater is approximately 500 meters, so it may be desirable for the marine seismic sources to be within 500/8=62.5 meters. In other embodiments, it may be desirable for the marine seismic sources to be within 50 meters, within 60 meters, etc. More details may be found in U.S. Pat. No. 8,139,443.

Figure 6C:
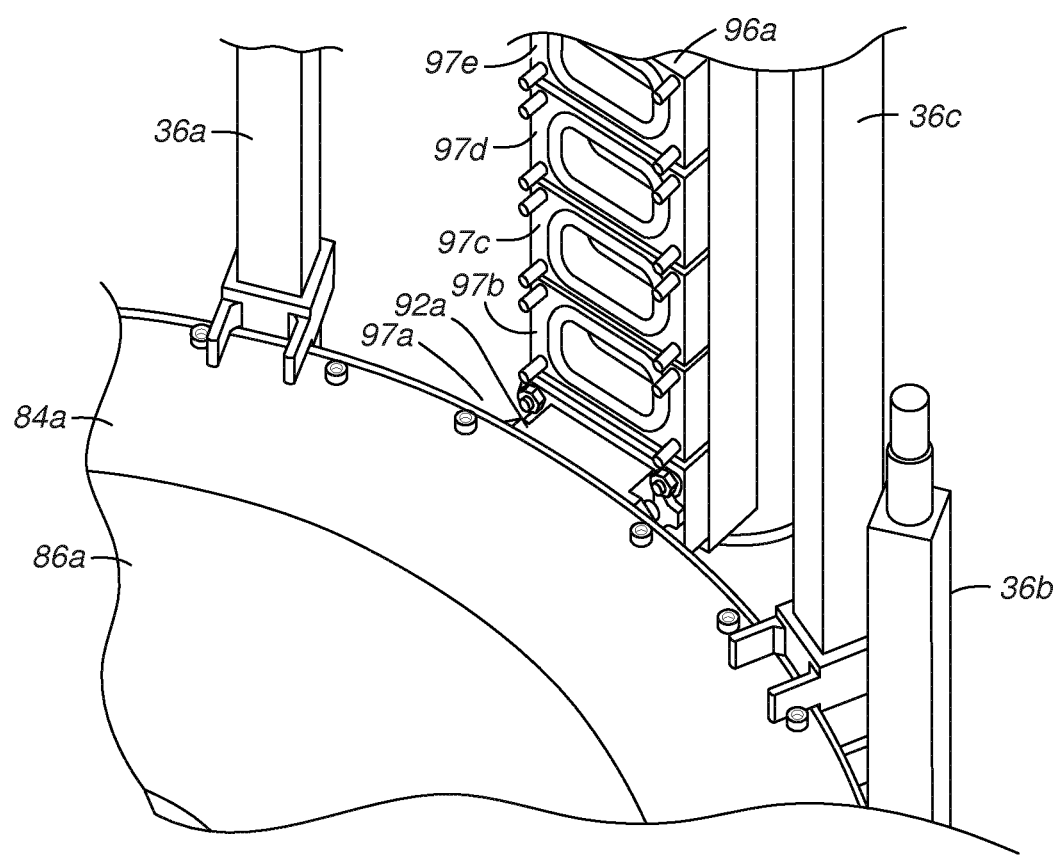
FIG. 6C illustrates a close-up view of the partial assembly shown in 6B.

FIG. 6C illustrates a close-up view of manifold 96a which may include, in one embodiment, eight port connectors (of which five port connectors 97a-97e corresponding to marine seismic sources 82a-82e are shown). FIG. 6C illustrates a partial assembly of an embodiment in which apparatus 94 may include one or more support structures 36a, 36b and 36c which may hold marine seismic sources 82a-82h in place within apparatus 94. Each of manifolds 96a, 96b, 96c, and 96d may be connected correspondingly to each of ports 92a, 92b, 92c, and 92d of marine seismic source 82a.

Figure 6D:
FIG. 6D illustrates an embodiment of an alternative apparatus according to the disclosure herein.

Although this embodiment includes a single stack of marine seismic sources 82 arranged along a common longitudinal axis (e.g., operating in series), other arrangements are also possible. For example in some embodiments, marine seismic sources 82 may be arranged in parallel instead of in series. In yet other embodiments, marine seismic sources 82 may be arranged in both series and parallel. One such embodiment is shown schematically in FIG. 6D, which includes three separate stacks of marine seismic sources 82a, 82b, 82c, and 82d. Various other possible arrangements or arrays will of course be apparent to one of ordinary skill in the art with the benefit of this disclosure.

In some embodiments, system 80 may be utilized in marine seismic survey. As such, system 80 may be towed behind a survey vessel at a particular water depth. Moreover, the marine seismic survey equipment may include several separately towable systems 80 (towed by one or more survey vessels) that may each include one or more marine seismic sources 82. For example, each marine seismic source 82 within each such system 80 may include one or more respective piezoelectric components. Marine seismic sources in such arrays may be arranged in series configurations such as apparatus 94 and/or parallel configurations. Each of these array configurations and other configurations may be used separately or in any combination. Such arrays may have corresponding one or more gas reservoirs, as described above.

Figure 6E:
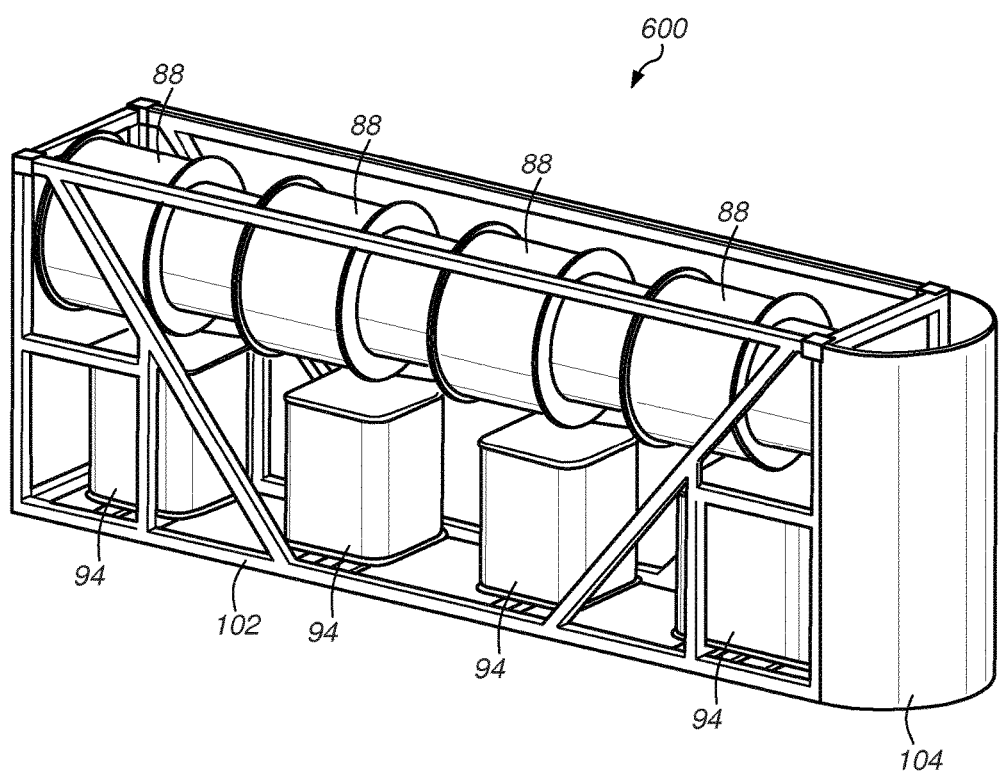
FIG. 6E illustrates an embodiment of a towable apparatus according to the disclosure herein.

One embodiment of a towable array is shown in FIG. 6E as array 600. In this embodiment, the array is built into frame 102, which may be made from (for example) welded structural members. Array 600 may also include nose cowling 104, which may reduce drag. As shown, array 600 includes four apparatuses 94, each of which includes a stack of individual marine seismic sources such as benders (not shown in FIG. 6E). Each apparatus 94 may also be coupled to a gas reservoir 88. In other embodiments, a single gas reservoir may be coupled to a subset or all of apparatuses 94. Array 600 may also be referred to interchangeably as a towable sled.

The arrangement and number of marine seismic sources 82, gas reservoirs 88 and other components shown in FIGS. 6A-6E is only for purposes of illustration and is not a limitation on the type of arrangements or number of components that may be used in any particular embodiment. For example, in one embodiment, each apparatus 94 may include 8 individual marine seismic sources in a stack, and array 600 may include 4 stacks (shown as apparatuses 94). The total number of individual marine seismic sources is thus 32 in this example. In another embodiment, similar performance may be obtained by using a single stack of 32 marine seismic sources, or two stacks of 16 marine seismic sources, etc. One of ordinary skill in the art with the benefit of this disclosure will understand that the exact arrangement of the individual marine seismic sources may be tailored to the needs of a particular embodiment.

Further, in some embodiments it may be advantageous to tow more than one array 600 during a marine seismic survey. For example, several (e.g., two, six, ten or more) arrays 600 may be towed in order to increase the sound pressure level attainable.

Figure 7:
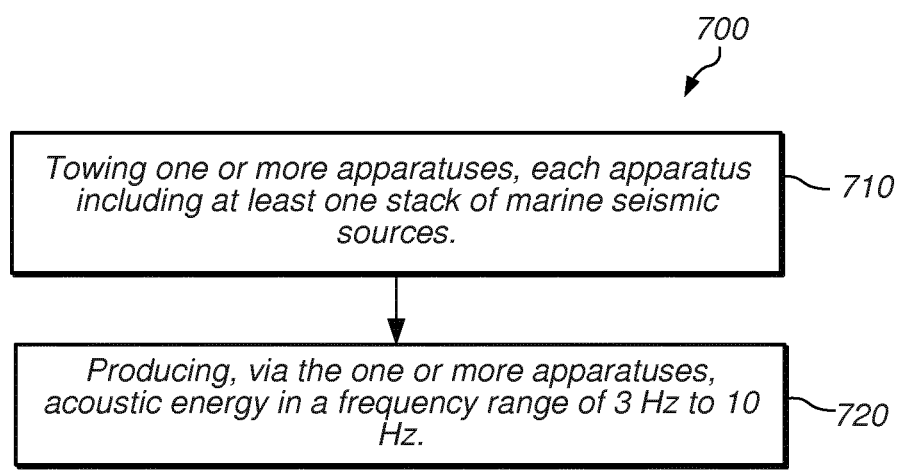
FIG. 7 illustrates a method according to an embodiment of the disclosure herein.

FIG. 7 is a flow diagram illustrating an embodiment of a method according to this disclosure. For example, FIG. 7 may depict a method of operating a resonant system such as system 80.

Flow begins at step 710. At step 710, one or more apparatuses are towed at a water depth of between 50 and 100 meters. The one or more apparatuses each include at least one stack of marine seismic sources. For example, the one or more apparatuses may be towable sleds. The marine seismic sources may include internal cavities that may contain a volume of gas. The volume of gas may in some embodiments be pressurized at a pressure that is at or near an ambient hydrostatic pressure of the water at the particular depth in which the marine seismic source may be operated. In one embodiment in which the one or more apparatuses are operating at a frequency of 5 Hz, the acoustic wavelength may be approximately 300 meters (e.g., based on a sound velocity in water of approximately 1,500 m/s), and the desired operating depth may therefore be determined to be approximately 75 meters. When the one or more apparatuses are being towed at a water depth of 75 meters or deeper below the water surface, the volume of gas may be pressurized to a pressure at or near an ambient hydrostatic pressure of the water at that particular depth or correspondingly higher.

The one or more apparatuses may additionally include one or more gas reservoirs that may contain another volume of gas. The one or more apparatuses may accordingly include a total volume of gas that includes a first portion of the volume of gas within the internal cavity and a second portion of the volume of gas within the gas reservoir, and a conduit coupling the marine seismic source to the gas reservoir. When the conduit couples the marine seismic source to the gas reservoir, a resonating gas flow may pass between the marine seismic source and the gas reservoir through the conduit. The resonance frequency may be based on, for example, at least one dimension of the conduit, and the marine seismic source may be driven at a driving frequency equal to (or similar to) the resonance frequency. Flow proceeds to step 720.

At step 720, acoustic energy in a frequency range of about 3 Hz to 10 Hz is produced via the one or more apparatuses. In one example, this may be accomplished by actuating the apparatuses at a driving frequency. In some embodiments, the one or more apparatuses may be actuated at a driving frequency of a voltage applied to the marine seismic sources. When the marine seismic sources include a piezoelectric component, applying electric energy to the piezoelectric component may cause the marine seismic sources to actuate (e.g., bend or flex) and produce acoustic energy. The marine seismic sources may actuate at a driving frequency of the voltage applied, which may in some instances be selected to be equal to (or similar to) the resonance frequency of the gas flow through the conduit. Flow ends at step 720.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method, comprising:
   towing a stack of marine seismic sources including at least one manifold having a plurality of port connectors configured to couple to each of the marine seismic sources, each marine seismic source comprises
      a structural member that defines a perimeter, a first side, and a second side opposite the first side and disposed about and extending along an axis of symmetry;
      a port defined through the perimeter of the structural member and coupled to one of the plurality of port connectors;
      a first disc being planar and extending continuously from the axis of symmetry radially to the structural member and coupled on the first side of the structural member;
      a second disc being planar and extending continuously from the axis of symmetry radially to the structural member and coupled on the second side of the structural member;
      a cavity defined within the structural member between the first and second discs, the cavity contains a volume of gas;
   distorting at least the first disc axially; and
   producing, via the stack of seismic sources, acoustic energy in a frequency range of 3 Hz to 10 Hz in response to distorting at least the first disc axially.

2. The method of claim 1, wherein the seismic sources are part of a towable sled.

3. The method of claim 1, further comprising at least one gas reservoir coupled to the stack of marine seismic sources via a conduit coupled to the at least one manifold.

4. The method of claim 3, further comprising:
   adjusting a resonance frequency of the at least one marine seismic source by changing at least one dimension of the conduit.

5. The method of claim 4, wherein adjusting the resonance frequency further comprises moving, via a motor, a first portion of the conduit relative to a second portion of the conduit.

6. The method of claim 1, wherein each marine seismic source further comprises a first piezoelectric member adhered to the first disc outside the cavity, the first piezoelectric member comprising a plurality of segmented piezoelectric components and the producing further comprises driving the first piezoelectric member with a sinusoidal voltage.

7. The method of claim 1, wherein the towing includes towing at a water depth of between 50 and 100 meters.

8. The method of claim 1, wherein producing acoustic energy further comprises producing at a sound pressure level in the range of 195 to 200 dB.

9. The method of claim 1, further comprising:
   wherein towing the stack of marine seismic sources further comprises towing a plurality of stacks of marine seismic sources;
   wherein producing acoustic energy results in production of acoustic energy at a first sound pressure level; and
   in response to a failure of a first stack the marine seismic sources of the plurality of stacks of marine seismic sources, producing, via a second stack of marine seismic sources acoustic energy at a second sound pressure level that is between 0 dB and −2 dB of the first sound pressure level.

10. A system, comprising:
    a seismic array comprising a first stack of seismic sources and including at least one manifold having a plurality of port connectors configured to couple to each of the seismic sources, each seismic source including
       a structural member that defines a perimeter, a first side, and a second side opposite the first side and disposed about and extending along an axis of symmetry;
       a port defined through the perimeter of the structural member and coupled to one of the plurality of port connectors;
       a first disc being planar and extending continuously from the axis of symmetry radially to the structural member and coupled on the first side of the structural member;
       a second disc being planar and extending continuously from the axis of symmetry radially to the structural member and coupled on the second side of the structural member;
       a cavity defined within the structural member between the first and second discs, the cavity contains a volume of gas; and
    wherein the system is operable to produce acoustic energy in a frequency range of 3 Hz to 10 Hz by distorting at least the first disc axially when the system is located at a water depth of between 50 and 100 meters.

11. The system of claim 10, wherein the system is operable to produce acoustic energy at a sound pressure level of 195 to 200 dB.

12. The system of claim 10, wherein the seismic array further comprises:
    a gas reservoir; and
    a conduit coupled to the first stack of marine seismic sources, the conduit fluidly couples the cavity to the gas reservoir.

13. The system of claim 12, wherein the conduit has at least one dimension that is adjustable, and wherein adjustments of the at least one dimension are operable to change a resonance frequency of the system.

14. The system of claim 13, wherein the at least one dimension includes a length of the conduit and a cross-sectional area of the conduit.

15. The system of claim 13, wherein the at least one dimension is adjustable via a portion of the conduit disposed within the gas reservoir.

16. The system of claim 10, wherein the system is operable to produce acoustic energy at a first sound pressure level by way of the first stack of marine seismic sources and a second stack of marine seismic sources, and wherein, in response to a failure of the first stack of marine seismic sources, the system is operable to produce, via at least the second stack of marine seismic sources, acoustic energy at a second sound pressure level that is between 0 dB and −2 dB of the first sound pressure level.

17. An apparatus, comprising:
a plurality of stacks of marine seismic sources, each of the plurality of stacks including at least one manifold having a plurality of port connectors configured to couple to each of the marine seismic sources and each marine seismic source including a structural member defining a perimeter including a port defined therethrough and coupled to one of the plurality of port connectors and including a first disc and a second disc each being planar and extending continuously from an axis of symmetry radially and in a spaced relationship to one another to attach to the structural member to define a cavity containing a volume of gas therebetween;
a gas reservoir; and
a conduit coupled between the gas reservoir and at least one of the plurality of stacks of marine seismic sources through the at least one manifold;
wherein the conduit is operable to permit a resonating flow of gas between the gas reservoir and the at least one of the plurality of stacks of marine seismic sources, and wherein the apparatus is operable to produce acoustic energy by distorting at least the first disc axially.

18. The apparatus of claim 17, wherein the apparatus is operable to produce the acoustic energy in a frequency range of 3 Hz to 10 Hz when the apparatus is located at a water depth of between 50 and 100 meters.

19. The apparatus of claim 18, wherein the frequency range is 3 Hz to 5 Hz.

20. The apparatus of claim 18, wherein a sound pressure level of the acoustic energy is between 195 dB and 200 dB.

21. The apparatus of claim 17, further comprising a motor operable to adjust at least one dimension of the conduit to adjust a resonance frequency of the apparatus.

22. The apparatus of claim 21, further comprising a computer-readable medium having stored thereon a lookup table, wherein the apparatus is configured to adjust the at least one dimension of the conduit based at least in part on the lookup table.

23. The method of claim 5, wherein the first portion of the conduit includes a first plate and the second portion of the conduit includes a second plate and each of the first and second plates define channels for engagement with one another to define a conduit channel having a cross-sectional area being variable in response to movement of the first plate and the second plate relative to one another via the motor.

24. The system of claim 23, wherein the channels of each of the first and second plates are in a spiral shape.

* * * * *